United States Patent [19]

Matsumoto et al.

[11] Patent Number: 5,653,534
[45] Date of Patent: Aug. 5, 1997

[54] SCREW APPARATUS AND METHOD FOR SUPPLYING REINFORCING FIBER-CONTAINING MOLTEN RESIN USING THE APPARATUS

[75] Inventors: Masahito Matsumoto, Ibaraki; Takeo Kitayama, Takatsuki, both of Japan

[73] Assignee: Sumitomo Chemical Company, Limited, Osaka, Japan

[21] Appl. No.: 541,456

[22] Filed: Oct. 10, 1995

[30] Foreign Application Priority Data

| Oct. 12, 1994 | [JP] | Japan | 6-246590 |
| Nov. 29, 1994 | [JP] | Japan | 6-295249 |
| Nov. 29, 1994 | [JP] | Japan | 6-295250 |
| Jan. 23, 1995 | [JP] | Japan | 7-008270 |

[51] Int. Cl.$^6$ .............. B27N 3/04; B28C 7/16; B28C 7/10
[52] U.S. Cl. .............. 366/76.1; 366/76.3; 366/76.6; 366/76.7; 366/76.9; 366/78; 366/91
[58] Field of Search .............. 366/69, 76.1, 76.3, 366/76.4, 76.5, 76.6, 76.7, 76.9, 76.91, 76.92, 78, 91, 97, 98, 99; 264/328.18, 328.5; 425/205

[56] References Cited

U.S. PATENT DOCUMENTS

| 3,317,962 | 5/1967 | Morse | 366/78 |
| 4,299,792 | 11/1981 | Nunn . | |
| 4,306,848 | 12/1981 | Nunn . | |
| 4,419,014 | 12/1983 | Gale | 366/99 |
| 4,797,242 | 1/1989 | Fukuda et al. . | |
| 5,165,941 | 11/1992 | Hawley | 425/205 |
| 5,264,261 | 11/1993 | Bush | 425/205 |
| 5,275,776 | 1/1994 | Hara et al. . | |
| 5,422,049 | 6/1995 | Kruger | 425/205 |
| 5,424,020 | 6/1995 | Hara et al. | 262/328.18 |

FOREIGN PATENT DOCUMENTS

| 0 340 873 B1 | 7/1992 | European Pat. Off. . |
| 42 36 662 A1 | 5/1993 | Germany . |
| 47-2191 | 2/1972 | Japan . |
| 48-946 | 1/1973 | Japan . |
| 58-110233 | 6/1983 | Japan . |
| 63-4920 | 1/1988 | Japan . |
| 1-286824 | 11/1989 | Japan . |
| 2-153714 | 6/1990 | Japan . |
| 2-235613 | 9/1990 | Japan . |
| 3-93510 | 4/1991 | Japan . |
| 4-286617 | 10/1992 | Japan . |
| 6-8278 | 1/1994 | Japan . |
| 491 731 | 7/1970 | Switzerland . |

OTHER PUBLICATIONS

Patent Abstracts of Japan, vol. 009, No. 303 (M–434) (Nov. 1985) & JP-A-60 141519.
Patent Abstracts of Japan, vol. 008, No. 050 (M–281) (Mar. 1984) & JP-A-58 203030.
Patent Abstracts of Japan, vol. 95, No. 002 & JP-A-07 052185 (Feb. 1995).
Patent Abstracts of Japan, JP-A-7001449, (Jan. 1995).

*Primary Examiner*—Robert W. Jenkins
*Attorney, Agent, or Firm*—Cushman Darby & Cushman IP Group of Pillsbury Madison & Sutro, LLP

[57] ABSTRACT

A screw apparatus comprises a melting extruder for melting a resin; a screw unit for kneading molten resin and reinforcing fibers to obtain a reinforcing fiber-containing molten resin and supplying it; and a mixer in which at least a part of the reinforcing fibers attach to the molten resin which is extruded from the melting extruder and flows down owing to gravity in an open space, and then the reinforcing fibers and the molten resin are fed into the screw unit.

49 Claims, 15 Drawing Sheets

SCREW APPARATUS AND METHOD FOR SUPPLYING REINFORCING FIBER-CONTAINING MOLTEN RESIN USING THE APPARATUS

BACKGROUND OF THE INVENTION

1. Field of the Invention

The present invention relates to a screw apparatus for supplying a reinforcing fiber-containing molten resin and a method for supplying a reinforcing fiber-containing molten resin by means the apparatus.

2. Related Background Art

As conventional methods for injection molding of a fiber-reinforced resin, methods in which reinforcing fibers are introduced into molten resin in a screw injection machine has been proposed (Japanese Patent Laid-Open (Kokai) Nos. 153714/1990 and 286617/1992).

However, according to the above conventional methods, the reinforcing fibers which can be fed uniformly have limit in their length and length of the reinforcing fibers after molded is still insufficient. Moreover, the state of dispersion of the reinforcing fibers in the resin is also insufficient to cause fluctuation in filling of the reinforcing fibers in the articles.

As another conventional method, a method in which fibers and a resin material (non-molten state) are respectively and directly introduced into an injection machine is known (Japanese Patent Laid-Open (Kokai) No. 8278/1994).

However, according to this conventional method, it is also difficult to keep the fibers in a long size, and the fiber length can be kept only at about 400–500 µm which is still insufficient.

SUMMARY OF THE INVENTION

The object of the present invention to provide a screw apparatus (screw injection apparatus, screw extrusion apparatus) and a method (injection method, extrusion method) for supplying of the reinforcing fiber-containing thermoplastic resin using the apparatus is to make it possible to obtain fiber-reinforced resin articles and fiber-reinforced resin pellets containing long reinforcing fibers which have not been able to be attained by conventional methods and further to make it possible to highly uniform the dispersion state of the reinforcing fibers in these articles or pellets.

The screw apparatus of the present invention comprises:

a melting extruder comprising a barrel which has a resin material inlet provided on the side of a first end portion thereof and a molten resin outlet provided on the side of a second end portion thereof (the second end portion is opposite to the first end portion), an extruding means positioned in the barrel, a driving means connected to the extruding means and a barrel heater for heating the barrel;

a screw unit comprising a cylinder having a feed opening provided on the side of a first end portion thereof and positioned under the molten resin outlet and an outlet provided on the side of a second end portion thereof (the second end portion is opposite to the first end portion), a screw inserted in the cylinder, a driving unit connected to the screw, and a cylinder heater for keeping the cylinder at a given temperature; and a mixer which is positioned between the molten resin outlet and the feed opening, which has a reinforcing fiber inlet, which defines a space through which reinforcing fibers fed from the reinforcing fiber inlet flow down owing to gravity together with molten resin extruded from the molten resin outlet and then the reinforcing fibers and the molten resin are fed to the feed opening, and in which at least a part of the reinforcing fibers attach to the molten resin flowing down owing to gravity in an open space.

The screw in the screw unit according to the screw apparatus of the present invention may have a mixing head at the tip.

In the screw apparatus of the present invention, it is preferred that the compression ratio is 4 or less and the apparent shear rate is 100 sec$^{-1}$ or less in the screw unit. It is further preferred that the apparent shear rate and the compression ratio in the screw unit are smaller than those in the melting extruder, respectively.

In the screw apparatus of the present invention, said mixer may further comprise a fiber cutter for cutting reinforcing long fibers to obtain reinforcing fibers having a given length and then introducing the fibers in scattered state into the reinforcing fiber inlet (the fiber cutter is positioned above the reinforcing fiber inlet).

The screw apparatus of the present invention may further comprise an accumulator positioned between the melting extruder and the mixer and having an accumulator inlet connected to the molten resin outlet and an accumulator outlet connected to the mixer.

Furthermore, in the screw apparatus of the present invention, it is preferred that an opening width of the feed opening (the opening width is a length in a direction perpendicular to the longitudinal direction of the cylinder) is equal to or more than an inner diameter of the cylinder; and an introduction space which extends to underneath of a horizontal plane passing the central axis of the screw is formed between an outer peripheral face of the screw and a cylinder internal face continuing to a cylinder side wall which defines the feed opening (the side wall is on the side where an outer peripheral part of the screw which has temporarily left from a cylinder internal face at the feed opening again approaches to the cylinder internal face while the screw is rotating).

Moreover, the screw apparatus of the present invention may further comprise a pushing rod positioned along a cylinder side wall which defines the feed opening (the side wall is parallel to the longitudinal direction of the cylinder) and having a face facing to the outer peripheral face of the screw; and a rod driving mechanism which reciprocates the pushing rod up and down.

When the molten resin and the reinforcing fibers are fed to the screw unit in such a state that at least a part of the reinforcing fibers attach to the molten resin flowing down owing to gravity in an open space, separation of the resin and the reinforcing fibers in the vicinity of the feed opening does not occur which would occur when the reinforcing fibers are merely introduced into the molten resin in the screw unit or when the reinforcing fibers and the resin material are merely introduced from the feed opening of the screw unit. Especially, even when reinforcing fibers of high bulk specific gravity are fed, according to the present invention, the reinforcing fibers are uniformly bitten between the cylinder and the screw channel near the feed opening and, thus, the reinforcing fibers are stably fed to the screw unit.

Further, since the reinforcing fibers are attached (distributed) to the molten resin in the route of introduction of the molten resin, namely, in the route of the molten resin being sagged and flowing down by the gravity from the outlet of the melting extruder, too much external force hardly acts on the reinforcing fibers when the reinforcing fibers are distributed to the molten resin, and, as a result, the reinforcing fibers hardly break at the subsequent kneading step.

Therefore, according to the screw apparatus of the present invention, very long reinforcing fibers (for example those of about 5–30 mm) which have hitherto been difficult to use can be used, and, in addition, breakage (cutting) of the reinforcing fibers at the time of kneading in the screw unit can be inhibited.

Moreover, according to the present invention, since at least a part of the reinforcing fibers are previously attached to the molten resin outside the screw unit and they are introduced in this state into the screw unit, the reinforcing fibers are already distributed in the molten resin to some extent at the point of time when the molten resin and the reinforcing fibers have reached to the screw unit. Therefore, a good dispersion state of the reinforcing fibers in the molten resin can be readily attained by the subsequent kneading without exerting a strong shearing force. Moreover, dispersion ratio of the resin component and the reinforcing fiber component can be uniform through the molten kneaded product.

In addition, since plasticization of the resin in the screw unit is not needed, it is not necessary to exert a strong shearing force for melting the resin, and shear rate and compression ratio for the kneading in the screw unit can be set independently from those in the melting extruder. Therefore, by setting the shear rate and the compression ratio at very low levels, the chance of breakage of the reinforcing fibers in the screw unit can be reduced and the reinforcing fibers can be kept at the further longer length.

Thus, according to the screw apparatus of the present invention, there can be obtained fiber-reinforced resin articles and fiber-reinforced resin pellets containing long reinforcing fibers (for example those of about 1.5–3.5 mm) and highly uniformed in the dispersion state of the reinforcing fibers, which have not hitherto been able to be obtained. Since the dispersion state of the reinforcing fibers in the molten kneaded product obtained by the present invention is satisfactory and, besides, the reinforcing fibers are long, the fiber-reinforced resin articles obtained by molding the molten kneaded product have superior mechanical strengths such as impact strength and flexural strength.

The melting extruder and the mixer in the screw apparatus of the present invention may be used as a mixing unit.

The mixing unit of the present invention comprises:
 a melting extruder comprising a barrel which has a resin material inlet provided on the side of a first end portion thereof and a molten resin outlet provided on the side of a second end portion (the second end portion is opposite to the first end portion), an extruding means provided in the barrel, a driving means connected to the extruding means and a barrel heater for heating the barrel; and
 a mixer which is connected to the molten resin outlet, which has a reinforcing fiber inlet, which defines a space through which reinforcing fibers fed from the reinforcing fiber inlet flow down owing to gravity together with molten resin extruded from the molten resin outlet, and in which at least a part of the reinforcing fibers attach to the molten resin flowing down owing to gravity in an open space.

According to the mixing unit of the present invention, at least a part of the reinforcing fibers are efficiently attached to the molten resin flowing down by the gravity in an open space. Additionally, when the molten resin and the reinforcing fibers are introduced in this state into a screw unit or the like, breakage (cutting) of the reinforcing fibers in the unit can be inhibited, and, in addition, very long reinforcing fibers can be used. Therefore, by using the mixing unit of the present invention, there can be obtained simply and efficiently fiber-reinforced resin articles and fiber-reinforced resin pellets containing long reinforcing fibers which have not hitherto been able to be attained.

Further, the screw unit in the screw apparatus of the present invention may be used as an independent screw unit.

The screw unit of the present invention comprises a cylinder having a feed opening provided on the side of a first end portion thereof and an outlet provided on the side of a second end portion thereof (the second end portion is opposite to the first end portion), a screw inserted in the cylinder, a driving unit connected to the screw, and a cylinder heater for keeping the cylinder at a given temperature, in which a compression ratio is 4 or less, and an apparent shear rate is 100 $\sec^{-1}$ or less.

Since in the screw unit of the present invention, the compression ratio is set at 4 or less and the apparent shear rate is set at the very low range of 100 $\sec^{-1}$ or less, the chance of the reinforcing fibers being cut at kneading is very small and the degree of the reinforcing fibers cut short in the resulting kneaded product is very low. Therefore, according to the screw unit of the present invention, there are obtained fiber-reinforced resin articles and fiber-reinforced resin pellets having a highly uniformed dispersion state of the reinforcing fibers while keeping fiber length of the reinforcing fibers longer than that in conventional methods. A compression ratio of 4 or less and an apparent shear rate of 100 $\sec^{-1}$ or less are the conditions under which it has been considered to be difficult to efficiently melt the fiber-reinforced resin pellets or resin materials and to highly uniformly disperse the reinforcing fibers into the molten resin, since conventionally it has been considered to be especially important to increase kneading speed.

The method for supplying a reinforcing fiber-containing molten resin of the present invention comprises:
 a step of attaching at least a part of reinforcing fibers to molten resin flowing down owing to the gravity in an open space outside a screw unit;
 a step of feeding the molten resin and the reinforcing fibers to a feed opening of the screw unit in such a state as at least a part of the reinforcing fibers attaching to the molten resin; and
 a step of kneading the molten resin and the reinforcing fibers by a screw of the screw unit and supplying the resulting reinforcing fiber-containing molten resin from an outlet of the screw unit.

In the method of the present invention, it is preferred that the molten resin and the reinforcing fibers are kneaded by the screw at a compression ratio of 4 or less and an apparent shear rate of 100 $\sec^{-1}$ or less. Furthermore, the method of the present invention may further comprise a step of extruding the molten resin from a molten resin outlet of a melting extruder.

The method of the present invention may further comprise a step of cutting reinforcing long fibers to obtain reinforcing fibers having a given length by means of a fiber cutter and directly feeding the reinforcing fibers in a scattered state from the fiber cutter.

When the molten resin and the reinforcing fibers are fed to the screw unit in such a state as at least a part of the reinforcing fibers being attached to the molten resin flowing down owing to the gravity in an open space as mentioned above; no separation occurs between the resin and the reinforcing fibers at around the feed opening and the reinforcing fibers can be stably fed as explained before. Furthermore, excessively great external force is hardly applied to the reinforcing fibers at the time of distribution of the reinforcing fibers into the molten resin, and, thus, the reinforcing fibers are hardly broken at this step. Moreover, according to the method of the present invention, it can be easy to attain a good dispersion state of the reinforcing fibers in the molten resin by kneading, and, besides, the dispersion ratio of the resin component and the reinforcing fiber component can be uniform through the whole molten kneaded product.

Therefore, according to the method of the present invention, use of very long reinforcing fibers (for example those of about 5-30 mm) which have hitherto been difficult to use becomes possible and, in addition, breakage of the reinforcing fibers during kneading in the screw unit can be inhibited. As a result, there can be obtained fiber-reinforced resin articles and fiber-reinforced resin pellets containing long reinforcing fibers (for example those of about 1.5-3.5 mm) and having a highly uniformed dispersion state of the reinforcing fibers which have not been able to be obtained up to now.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
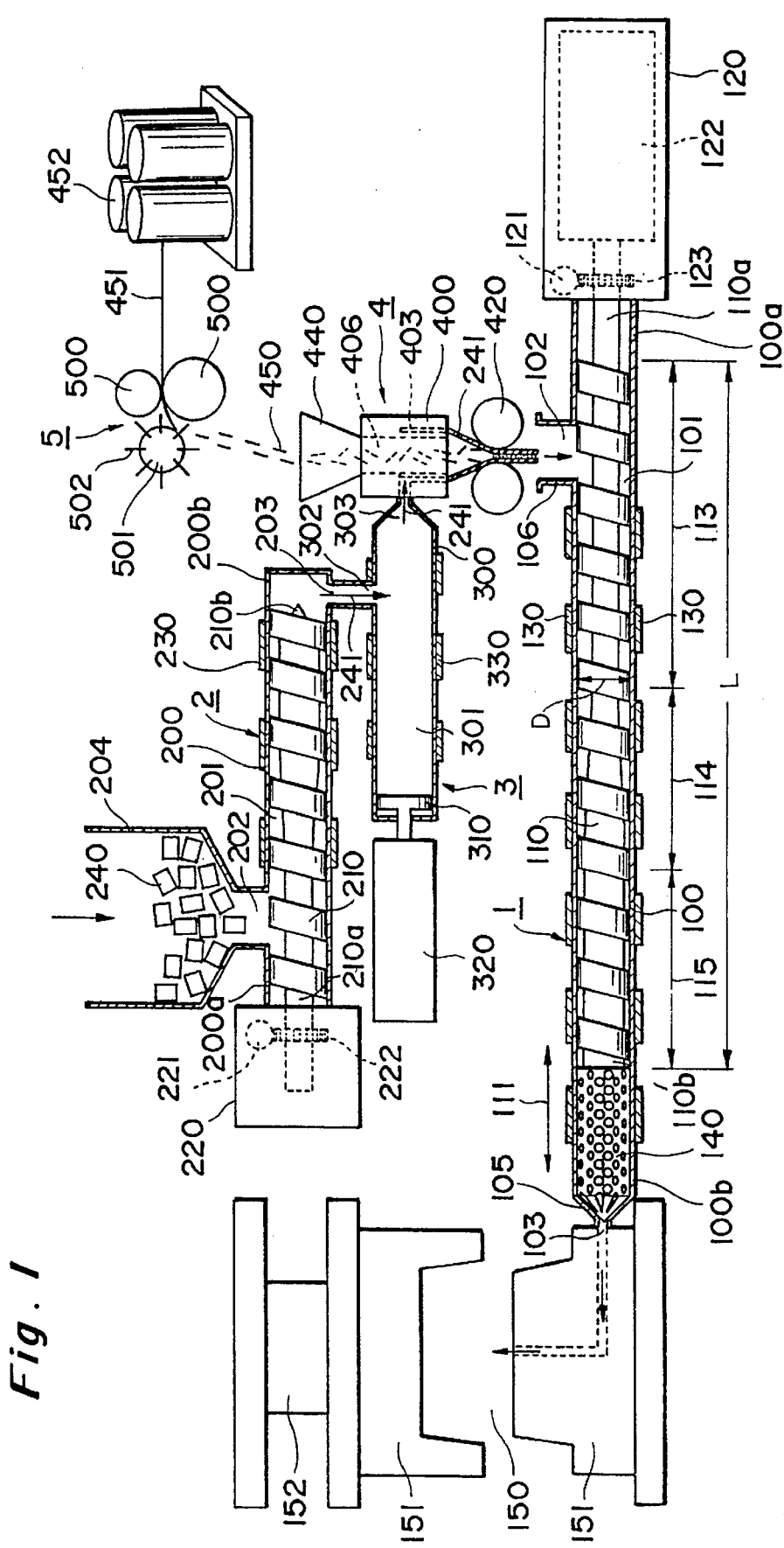
FIG. 1 is a schematic sectional view of one example of the screw apparatus of the present invention.

The present invention will be explained in connection with the accompanying drawings. These drawings shown one example of the present invention and the present invention is never limited to the embodiments shown in these drawings. In the drawings, the same portions or the corresponding portions are indicated by the same reference numerals.

First, the screw apparatus of the present invention as well as the method for supplying the reinforcing fiber-containing molten resin of the present invention will be explained below.

FIG. 1 is a whole schematic view of one example of the screw apparatus of the present invention. The screw apparatus shown in FIG. 1 has screw unit 1, melting extruder 2, accumulator 3 and mixer 4. The molten resin extruded from the melting extruder 2 is introduced into the mixer 4 through the accumulator 3. In the mixer 4, at least a part of the reinforcing fibers attach to the molten resin which flows down owing to the gravity in the open space, and the molten resin and the reinforcing fibers in this state are introduced from feed opening 102 of the screw unit 1.

Each part of the screw apparatus of the present invention will be explained in detail below.

(Melting Extruder 2)

The melting extruder 2 has barrel (heating cylinder) 200, extrusion screw 210 inserted in chamber 201 formed in the barrel 200 in the longitudinal direction, driving means 220 connected to the extrusion screw 210, and barrel heater 230 positioned on the outer peripheral surface of the barrel 200. The barrel 200 has resin material inlet (feed opening) 202 provided on the side of a first end portion 200a and molten resin outlet 203 provided on the side of a second end portion 200b (the second end portion 200b is opposite to the first end portion 200a), and the resin material inlet 202 and the molten resin inlet 203 communicate with each other through the chamber 201. The resin material inlet 202 opens upwardly and hopper 204 is fitted to the resin material inlet 202. Pellet or powder thermoplastic resin material 240 is introduced from resin material inlet 202.

The melting extruder 2 shown in FIG. 1 is a single screw extruder provided with a single screw 210, and driving means 220 has motor (rotation driving unit) 221 for rotating the extrusion screw 210. Therefore, the extrusion screw 210 is rotated by the motor 221 through gear 222 provided on the side of the base end portion 210a.

The barrel heater 230 heats the barrel 200 so that the barrel reaches a given temperature (optionally selected depending on the desired resin viscosity, etc. and not so as to cause deterioration of the resin with oxidation in the temperature range of the melting point or higher of the resin used).

Therefore, the extrusion screw 210 is rotated by motor 221 and carries the resin material 240 introduced from resin material inlet 202 towards the side of the tip 200b of the melting extruder 2. During this period, the introduced resin material 240 is melted (plasticized) by the heating with barrel heater 230 and the generation of heat (frictional heat) owing to shearing action, and is discharged from the molten resin outlet 203 as molten resin 241.

The discharging amount (per unit time) of molten resin 241 discharged from the molten resin outlet 203 is determined by the speed of rotation of screw 210. The total discharging amount is determined by the total number of rotation of screw 210.

(Accumulator 3)

In FIG. 1, accumulator 3 is connected to the melting extruder 2. The accumulator 3 has accumulator barrel 300, piston 310 inserted in accumulator chamber 301 formed in the barrel 300 in the longitudinal direction thereof, piston driving means 320 connected to the piston 310, and accumulator barrel heater 330 positioned on the outer peripheral surface of the barrel 300. The accumulator barrel 300 has accumulator inlet 302 connected to the molten resin outlet 203, and accumulator outlet 303. The inlet 302 and the outlet 303 communicate with each other through the chamber 301.

The accumulator barrel heater 330 keeps the temperature of the accumulator barrel 300 at a given temperature (optionally selected depending on the desired resin viscosity, etc. and not so as to cause deterioration of the resin with oxidation in the temperature range of the melting point or higher of the resin used).

In a case where the screw apparatus of the present invention comprises the accumulator 3, the melting extruder 2 can continuously work irrespective of the operation of screw unit 1, and the molten resin 241 continuously extruded from the melting extruder 2 is temporarily stored in accumulator 3. When the amount of the stored molten resin 241 reaches a given amount, the molten resin 241 in an amount very close to the given amount is extruded from accumulator outlet 303 by the forward movement of piston 310.

Figure 2:
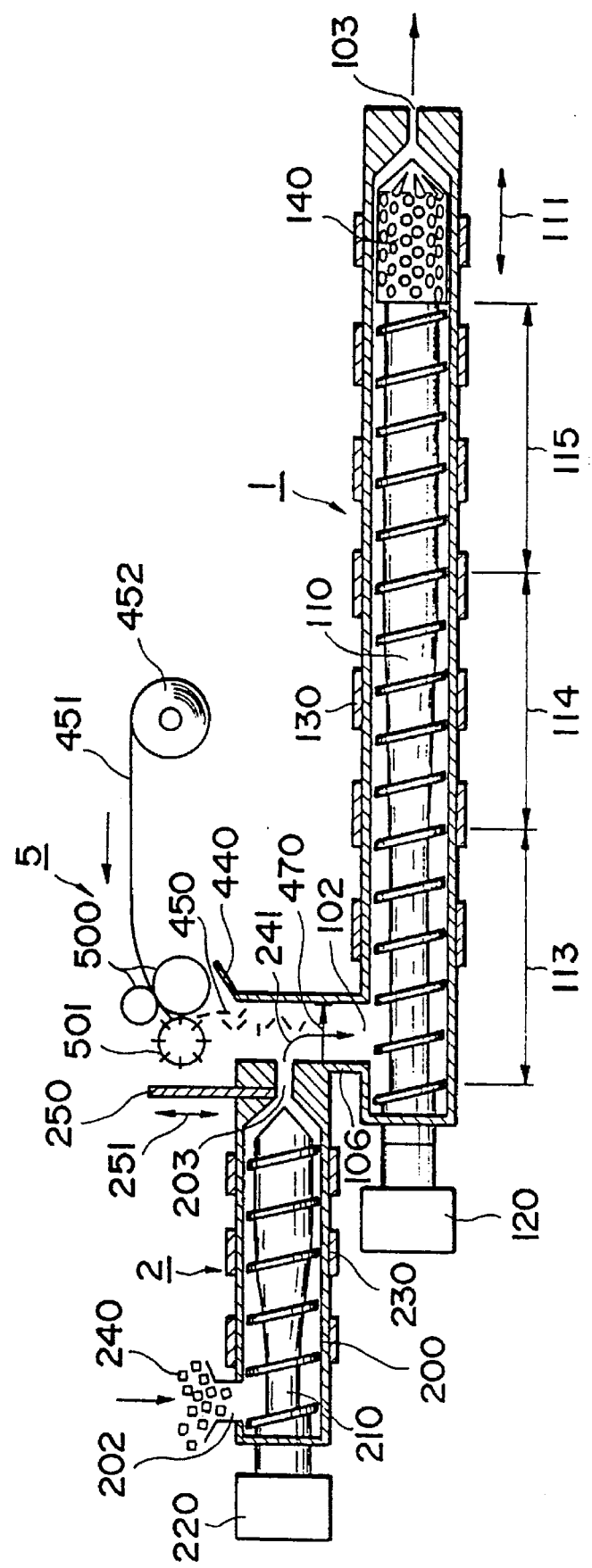
FIG. 2 is a schematic sectional view of another example of the screw apparatus of the present invention.

When the accumulator 3 is connected to the outlet 203 of the melting extruder 2 in this way, the feeding rate of molten resin 241 can be made considerably uniform. In the screw apparatus of the present invention, the accumulator 3 may not be used as shown in FIG. 2, but, in this case, it is preferred to provide a shut-off valve 250 movable in the direction of the double end arrow 251 at the molten resin outlet 203. The shut-off valve 250 is opened or closed when discharging or stopping of the molten resin 241, respectively.

(Mixer)

Figure 3:
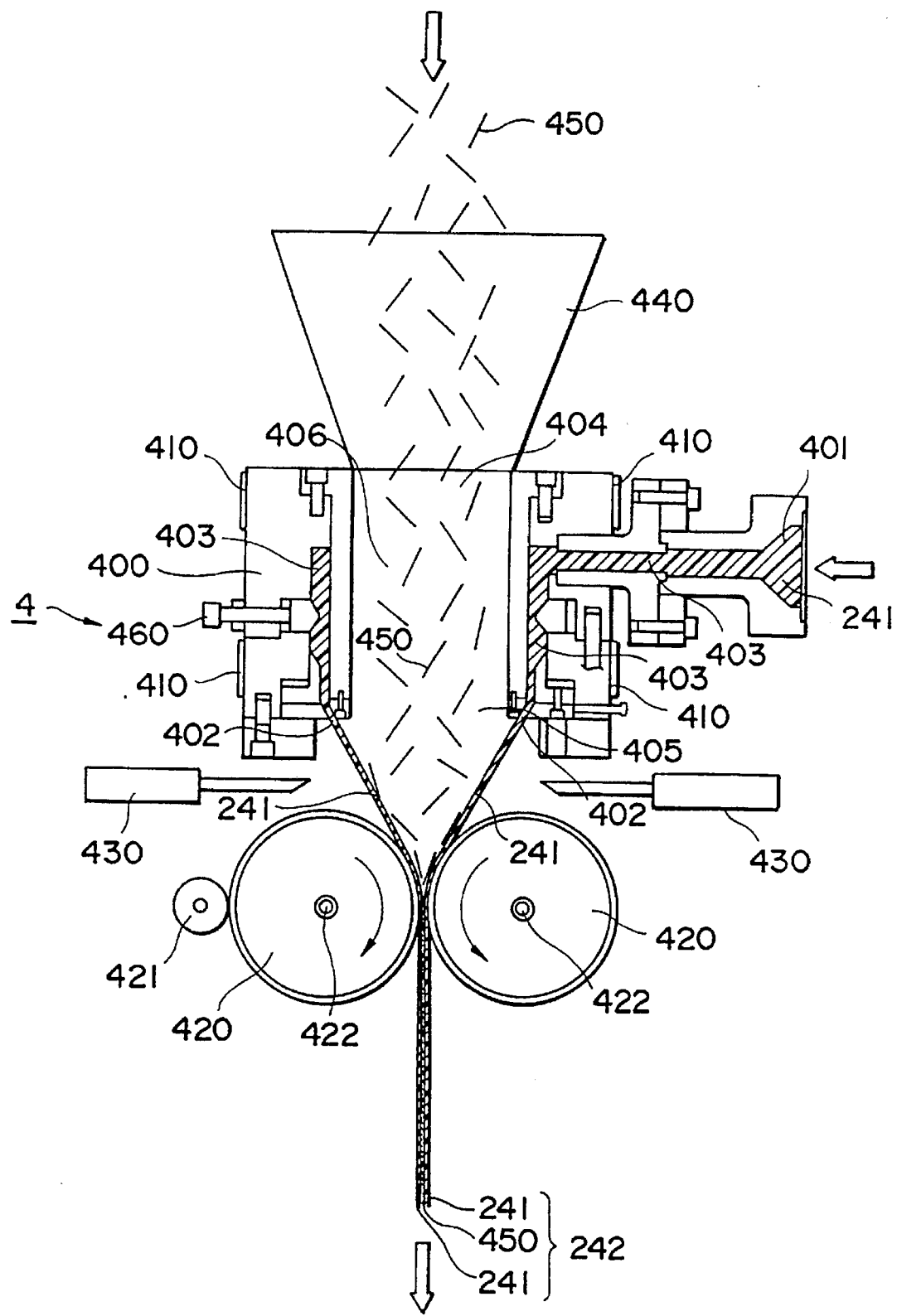
FIG. 3 is a schematic sectional view of one example of the mixer according to the present invention.

FIG. 3 shows one example of the mixer of the present invention suitably used in the screw apparatus of the present invention.

The mixer 4 shown in FIG. 3 has nozzle 400 connected to the accumulator 3, nozzle heater 410 positioned on the outer periphery of the nozzle 400 and a pair of rollers 420 positioned under the nozzle 400. The nozzle 400 has a first opening 401 functioning as the molten resin inlet, a second opening 402 provided at the bottom of thereof and communicating with the first opening 401 through resin passage 403 (the second opening 402 is a ring hole), a third opening 404 functioning as the reinforcing fiber inlet, and a fourth opening 405 provided inside the second opening 402 and communicating with the third opening 404 through fiber passage 406.

The nozzle heater 410 keeps the temperature of the nozzle 400 at a given temperature (optionally selected depending on the desired resin viscosity, etc. and not so as to cause deterioration of the resin with oxidation in the temperature range of the melting point or higher of the resin used). Furthermore, a motor 421 for rotation of rollers is connected to the rollers 420 and cooling water pipe 422 for cooling the rollers is provided to the rollers 420.

Moreover, the mixer 4 has resin cutter 430 for cutting the ring-shaped molten resin 241 extruded from nozzle 400 and flows down (the resin cutter 430 is positioned between the under surface of nozzle 400 and rollers 420), hopper 440 for guiding reinforcing fibers 450 to reinforcing fiber inlet 404, and valve 460 for adjusting the pressure of the molten resin 241 which passes the resin passage 403.

In the mixer 4 shown in FIG. 3, the molten resin 241 fed from accumulator 3 through the first opening 401 is extruded in the ring-shaped (tubular) form and flow down from the second opening 402. On the other hand, the reinforcing fibers 450 fed through the third opening 404 pass through the fourth opening 405 and drop inside the ring-shaped molten resin 241. Therefore, at least a part of the reinforcing fibers 450 attach to the inner surface of the ring-shaped molten resin 241 flowing down by the gravity in an open space. Further, the ring-shaped molten resin 241 is slightly pressed by a pair of rollers 420 together with the reinforcing fibers 450 present inside the ring-shaped molten resin 241 to obtain a sheet-like molten resins 242 between which the reinforcing fibers are sandwiched.

According to this way, the reinforcing fibers 450 are more surely distributed (attached) to the molten resin 241. Thus, even if the reinforcing fibers 450 are long, separation of the resin and the reinforcing fibers at around the feed opening 102 is prevented, and the reinforcing fibers are uniformly and stably fed to the screw unit 1. Therefore, it becomes possible to use long reinforcing fibers which have hitherto been difficult to use and, furthermore, breakage of the reinforcing fibers in the course of kneading in the screw unit 1 is inhibited, and a uniform dispersion state of the reinforcing fibers can be easily attained.

Furthermore, when the reinforcing fibers 450 and the molten resin 241 are fed to the screw unit 1 as sheet-like molten resins 242 between which the reinforcing fibers are sandwiched as mentioned above, inclusion of air in the molten resin 241 in the screw unit 1 can be sufficiently inhibited, and articles free from voids and having further improved properties can be obtained.

Moreover, as shown in FIG. 1, the mixer 4 in this example is further provided with fiber cutter (roving cutter) 5 for cutting the reinforcing long fibers to obtain reinforcing fibers having a given length and then introducing the reinforcing fibers in scattered state into the reinforcing fiber inlet 404 (the fiber cutter 5 is positioned above hopper 440).

(Roving Cutter 5)

Roving cutter 5 has a pair of feed rolls 500 for delivering many continuous length reinforcing fibers (reinforcing long fibers) 451 wound on reel 452 in the flatly spread state, and cutting roll 501 provided on the outlet side of the feed rolls 500 and having a width wider than the feeding width of the reinforcing fibers 451. The cutting roll 501 has a plurality of blades 502 which instantaneously and rotatively contact with the lower feed roll 500, and the reinforcing long fibers 451 are cut to reinforcing fibers 450 having a constant length by the blades 502 and the feed roll 500. Therefore, the reinforcing fibers 450 are dispersed in the range of feeding width of the reinforcing long fibers 451 by the feed rolls 500 (somewhat wider range than the feeding width) and are dropped.

The position and rotating direction of cutting roll 501 are set so that the dropping direction of reinforcing fibers 450 is toward the hopper 440 and the reinforcing fiber inlet 404.

The length of reinforcing fibers 450 is determined by the arranging pitch of blades 502 fixed on cutting roll 501 and set usually in the range of 3–30 mm. In this connection, length of the commercially available reinforcing fibers (chips) is usually 3 mm, and reinforcing fibers 450 having various lengths other than those of commercially available fibers can be simply and efficiently obtained by using the above roving cutter 5. In addition, when the reinforcing fibers 450 are directly fed to the mixer 4 from the roving cutter 5, agglomeration of the reinforcing fibers 450 can be inhibited. Therefore, the reinforcing fibers 450 cut to a constant length by the roving cutter 5 are distributed in the scattered state to the molten resin 241 which flows down, and the degree of distribution (uniforming) of the reinforcing fibers to the molten resin is further improved.

In the screw apparatus of the present invention, it is possible to use very long reinforcing fibers which have hitherto been difficult to use as mentioned before, and, besides, when the longer reinforcing fibers are used, the length of the reinforcing fibers in the resulting fibers tends to be longer. Therefore; the length of the reinforcing fibers 450 used in the present invention is preferably 5–30 mm, especially preferably 13–25 mm.

For example, using roving glass fibers of 1100 tex (g/m) as reinforcing long fibers 451, nine of the fibers are fed between a pair of feed rolls 500 and cut by the cutting roll 501, and, thus, reinforcing fibers 450 having a length of 15 mm can be obtained. The feeding speed of reinforcing fibers 450 from cutting roll 501 is set, for example, at 3 kg/min.

Figure 4:
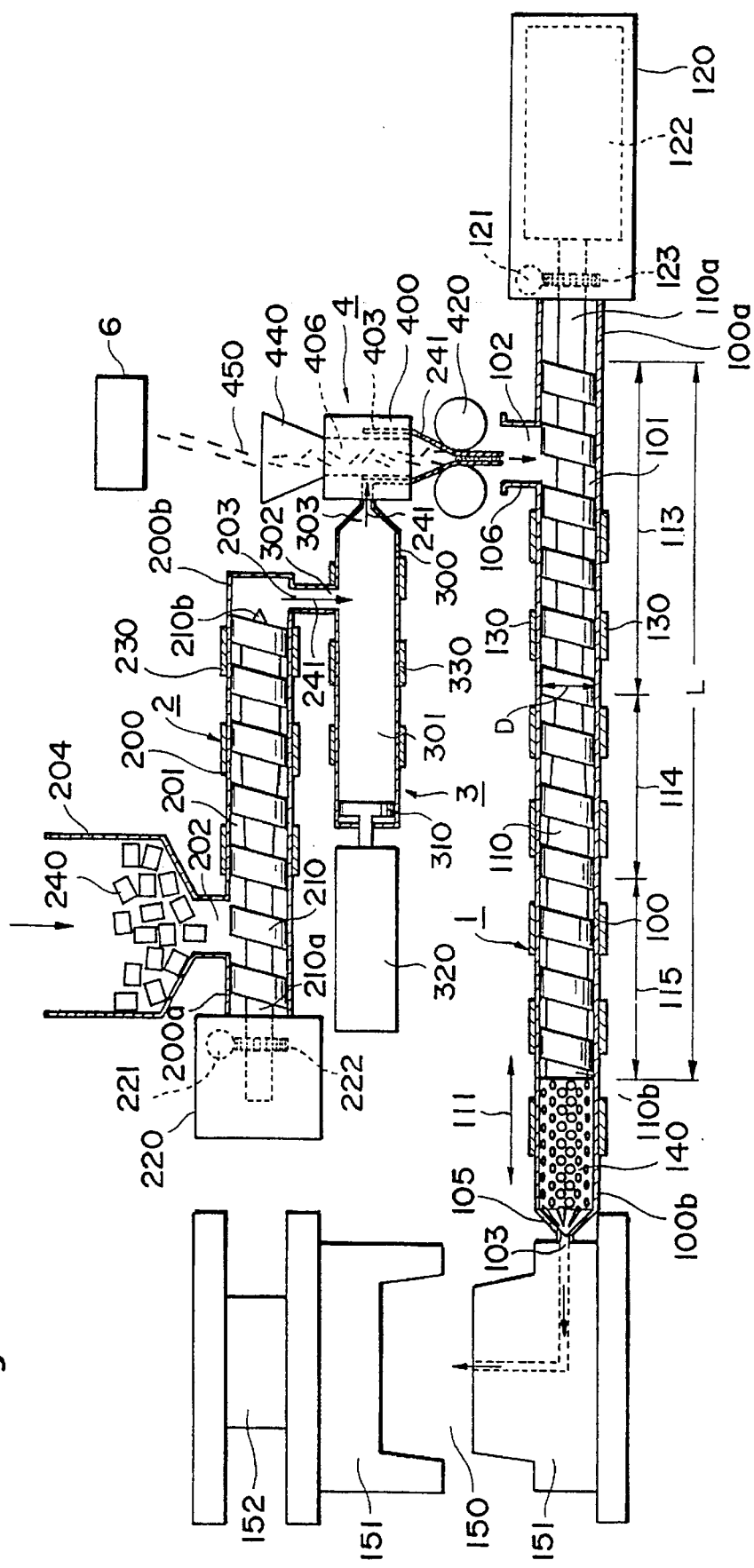
FIG. 4 is a schematic sectional view of still another example of the screw apparatus of the present invention.

In the above example, the reinforcing fibers 450 dropping from roving cutter 5 are directly contacted with molten resin 241 discharged from molten resin outlet 203 through nozzle 400, but previously cut reinforcing fibers 450 may be distributed (fed) to the flowing passage of the molten resin 241 by a vibrating feeder 6 or the like as shown in FIG. 4.

Furthermore, in either case of directly feeding the reinforcing fibers 450 cut by the roving cutter 5 or feeding them using a vibrating feeder 6, etc., mixers as shown in FIGS. 2 and 5, FIGS. 6 and 7, FIGS. 8 and 9, and FIG. 10 may be employed for attaching (distributing) at least a part of reinforcing fibers 450 to molten resin 241.

Figure 5:
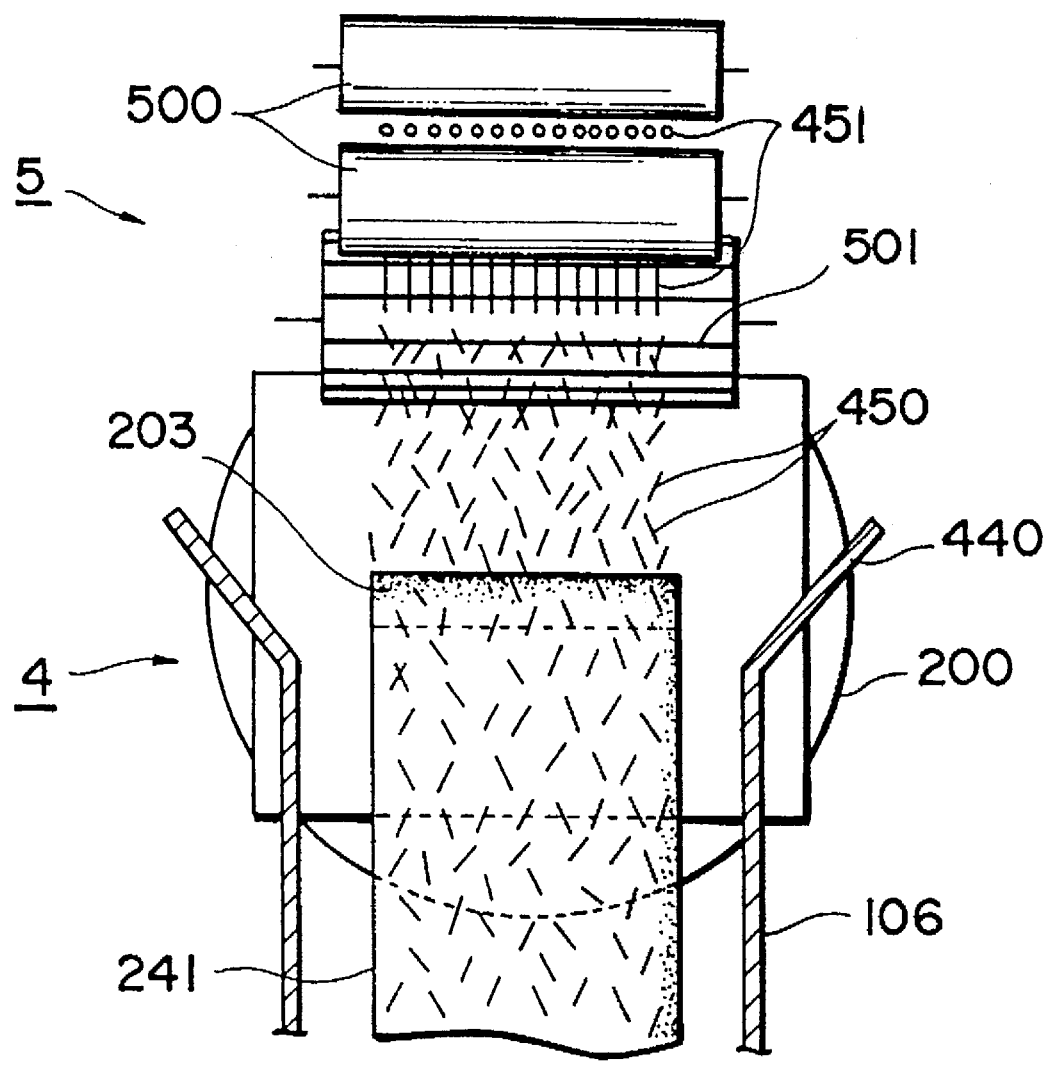
FIG. 5 is a front sectional view which shows a relation between the molten resin outlet of the melting extruder and the roving cutter in FIG. 2.

In the mixer 4 shown in FIGS. 2 and 5, nozzle 400 is not connected to molten resin outlet 203 which directly functions as the molten resin inlet of the mixer, and a strip-like molten resin 241 is directly extruded from a horizontally long and flat rectangular outlet 203 and drops by the gravity.

Furthermore, a cylindrical protective pipe 106 is provided between the outlet 203 and the inlet 102 of the screw unit 1, and a funnel-shaped hopper 440 (functioning as the reinforcing fiber inlet of the mixer) is formed at the upper end of the protective pipe 106. Roving cutter 5 is positioned above the hopper 440. The size of horizontal section of the protective pipe 106 is set to be larger than the section of the molten resin 241 discharged from inlet 203, and the protective pipe 106 is positioned in such a manner that the inner surface does not contacts with the molten resin 241.

The position of the roving cutter 5 is set so that the dropping passage of reinforcing fibers 450 joins with the upper stream portion (in the vicinity of outlet 203) of the passage of the molten resin 241 which is discharged from outlet 203 and hangs and flows down (hereinafter referred to as merely "flow-down passage"). Furthermore, it is set so that the range of dropping of the reinforcing fibers 450 nearly meets with the width of the molten resin 241 which is discharged from outlet 203 and flows down.

In the mixer 4 shown in FIGS. 2 and 5, an openable and closable shutter 470 for temporarily stopping the feeding of molten resin 241 and reinforcing fibers 450 is provided midway of the protective pipe 106. Such shutter 470 may be provided near the outlet 203, and when nozzle 400 is provided, the shutter 470 may be provided in the nozzle.

When attaching of reinforcing fibers 450 to molten resin 241 is carried out in such a manner that the reinforcing fibers 450 are distributed to the molten resin 241 in the vicinity of the outlet 203 of melting extruder 2 as shown above, also the chance of contacting of the reinforcing fibers 450 with molten resin 241 during the molten resin 241 flowing down from outlet 203 and being introduced into feed opening 102 of the screw unit 1 increases, and, therefore, distribution (attaching) of reinforcing fibers 450 to the molten resin 241 in this flow-down passage is accelerated, and, accordingly, uniform dispersion of reinforcing fibers 450 is accelerated.

Figure 6:
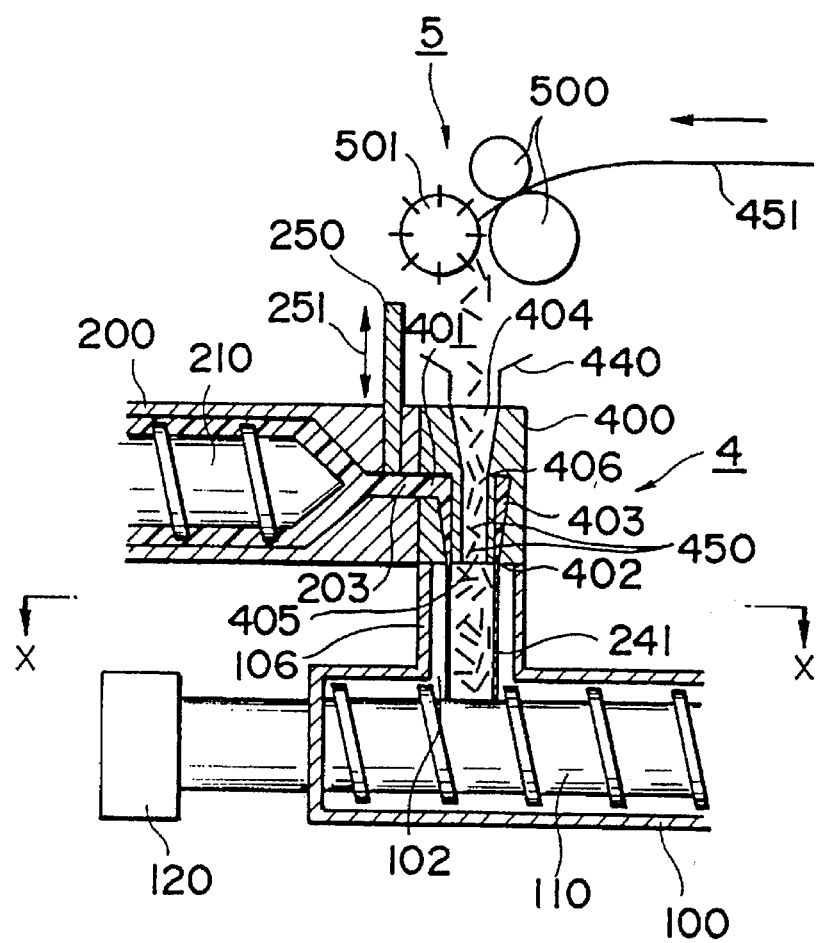
FIG. 6 is a schematic sectional view of another example of the mixer according to the present invention.
Figure 7:
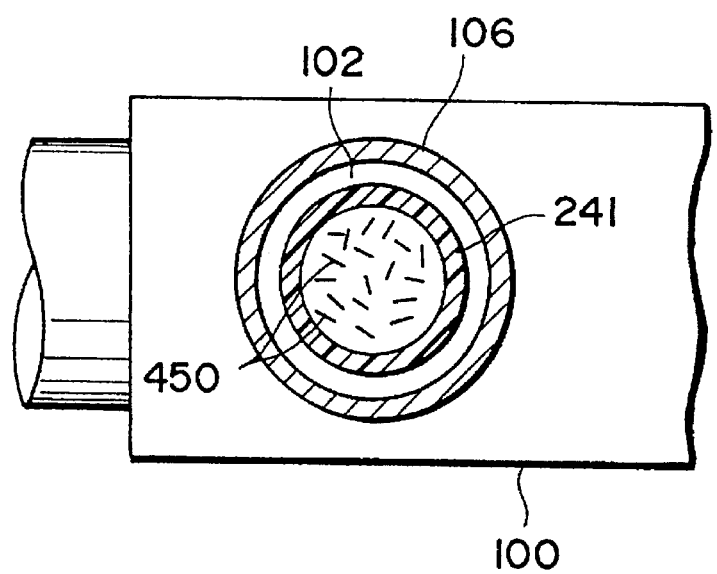
FIG. 7 is a sectional view of the mixer shown in FIG. 6, taken along line X—X of FIG. 6.

In the mixer 4 shown in FIGS. 6 and 7, nozzle 400 is provided to be connected to outlet 203 of melting extruder 2, and a ring-shaped outlet port (opening) 402 is formed on the bottom of the nozzle 400. Specifically, the nozzle 400 has a first opening 401 functioning as the molten resin inlet, the second opening (the outlet port) 402 communicating with the first opening 401 through a resin passage 403, a third opening 404 functioning as the reinforcing fiber inlet, and a fourth opening 405 provided inside the second opening 404 and communicating with the reinforcing fiber inlet 404 through a fiber passage 406. The construction is such that molten resin 241 is downwardly discharged in the form of a tube from the outlet port 402, a through-hole (fiber passage) 406 which piercing downward and upward within the space surrounded by the ring-like outlet port 402 is formed in the nozzle 400, and a funnel-shaped hopper 440 is provided connecting to the upper opening (reinforcing fiber inlet 404) of the through-hole 406. A roving cutter 5 (which may be a vibrating feeder) is positioned above the inlet 404, and the reinforcing fibers 450 cut by the roving cutter 5 are dropped into through-hole 406. The cylindrical (tube-like) molten resin 241, inside of which has at least a part of reinforcing fibers 450 attached (distributed) thereto, are introduced into feed opening 102.

In this case, the molten resin 241 is introduced into feed opening 102 in such a state that the resin covers the reinforcing fibers 450, and the reinforcing fibers 450 are sufficiently uniformly distributed during the period of from the molten resin 241 to which a part of the reinforcing fibers 450 attach being introduced into the feed opening 102 to the resin reaching metering zone 115 of screw 110, and, thus, the dispersion of reinforcing fibers 450 in molten resin 241 is further improved.

When, as mentioned above, the molten resin 241 is allowed to flow down in the form of a tube and reinforcing fibers 450 are dropped from the upper end of said tubular flow into the area of the tubular flow thereby to distribute (attach) the fibers 450 to the melt resin 241, the contact area between the reinforcing fibers 450 and the molten resin 241 markedly increases as compared with the case when the molten resin flows down in the form of a single rod, and the degree of distribution (attaching) of reinforcing fibers 450 to molten resin 241 is improved.

Figure 8:
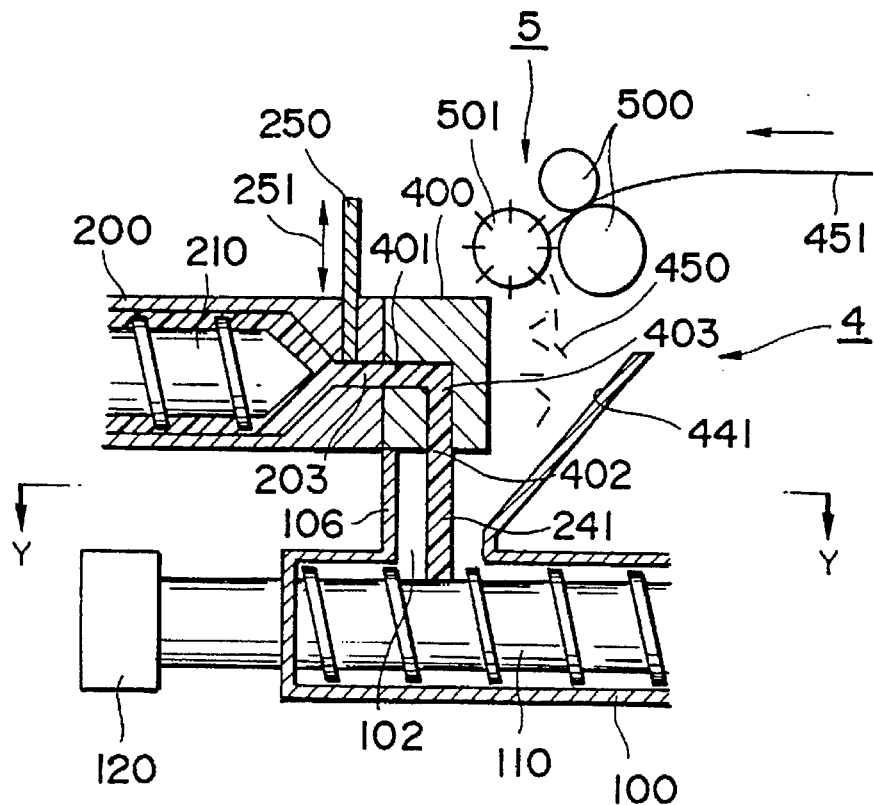
FIG. 8 is a schematic sectional view of still another example of the mixer according to the present invention.
Figure 9:
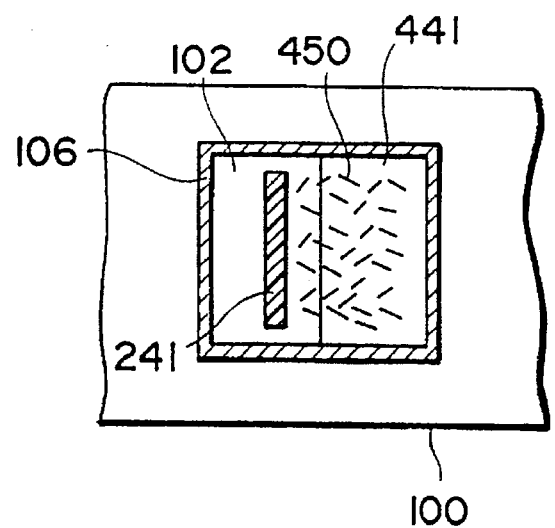
FIG. 9 is a sectional view of the mixer shown in FIG. 8, taken along line Y—Y of FIG. 8.
Figure 10:
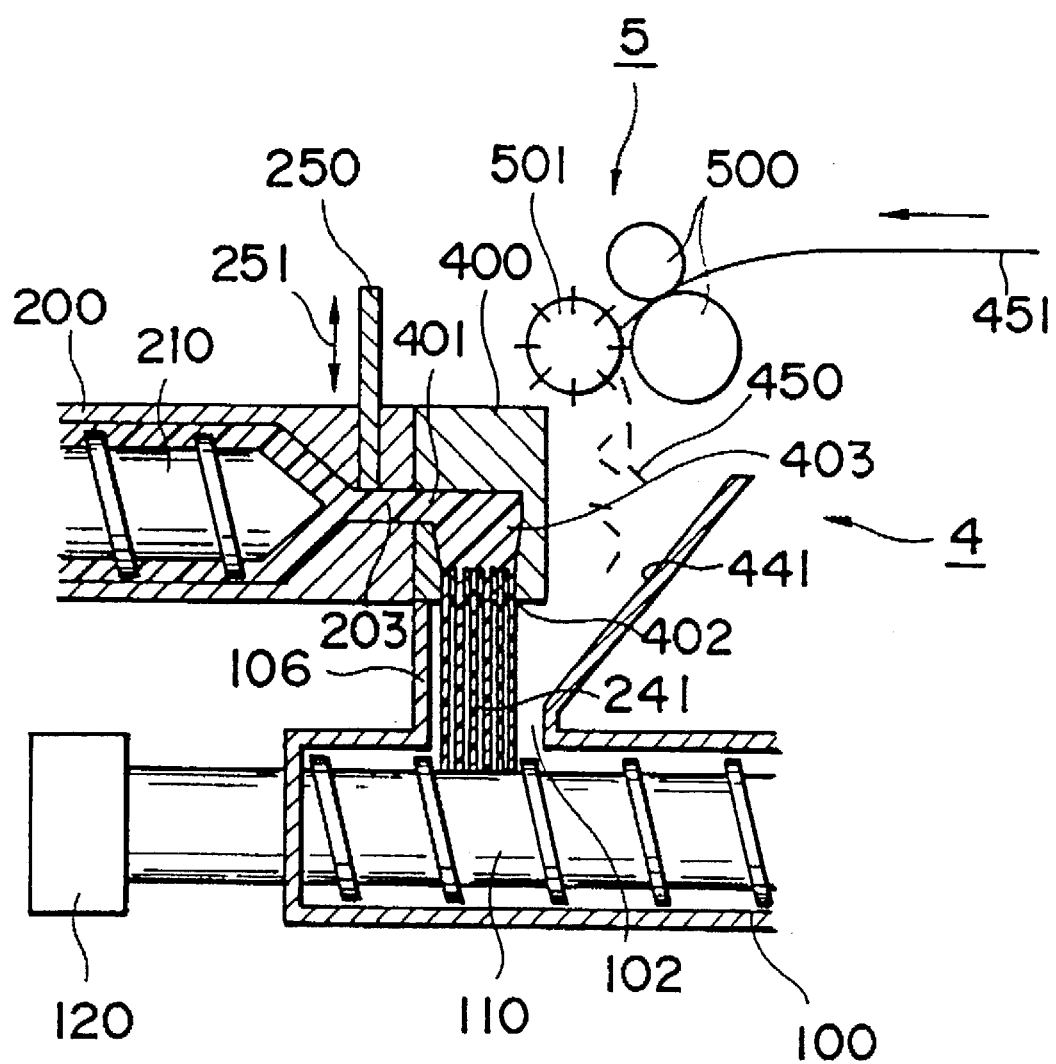
FIG. 10 is a schematic sectional view of further another example of the mixer according to the present invention.

In the mixer 4 shown in FIGS. 8 and 9, nozzle 400 is provided connecting to the outlet 203 of melting extruder 2, and a rectangular outlet port (opening) 402 is formed on the bottom of the nozzle 400. Specifically, the nozzle 400 has a first opening 401 functioning as the molten resin inlet, and the second opening (the outlet port) 402 communicating with the first opening 401 through a resin passage 403. Further, the mixer 4 comprises a chute 441 for guiding the reinforcing fibers 450 fed from the reinforcing fiber inlet to around the molten resin 241 extruded from the nozzle 400. In this case, a strip-like molten resin 241 having a given width is discharged from the outlet port 402 and flows down. The horizontal section of protective pipe 106 is in the form of rectangular similar to the section of the molten resin 241, and a chute 441 having a transverse width which is the same as the flowing width of the molten resin 241 is provided at one side wall of the protective pipe 106 (the side wall is facing to the flat face of the molten resin 241 which flows down). At least a part of the reinforcing fibers 450 repulsed on the chute 441 and guided to near the molten resin 241 attach to the molten resin 241. In this case, thickness of the strip-like molten resin 241 can be controlled with ease and this is advantageous in that the area of the molten resin 241 against which the reinforcing fibers 450 can collide (contact) can be changed depending on the amount of the reinforcing fibers 450 fed.

When, as mentioned above, the molten resin 241 is allowed to flow down in the form of a strip and reinforcing fibers 450 are distributed (attached) to the melt resin 241 in the form of strip, the contact area between the reinforcing fibers 450 and the molten resin 241 increases as compared with the case when the molten resin flows down in the form of a single rod, and the degree of distribution (attaching) of reinforcing fibers 450 to the molten resin 241 is improved.

In the mixer 4 shown in FIG. 1, nozzle 400 having the outlet port (opening) 402 comprising many small holes provided at the bottom face thereof is provided connecting to the molten resin outlet 203 of the melting extruder 2. Specifically, the nozzle 400 has a first opening 401 functioning as the molten resin inlet, and the second opening (the outlet port) 402 communicating with the first opening 401 through a resin passage 403. Further, the mixer 4 comprises a chute 441 for guiding the reinforcing fibers 450 fed from the reinforcing fiber inlet to around the molten resin 241 extruded from the nozzle 400. From this outlet port 402, molten resin 241 flows down in the form of many rods or lines with a given space between the rods or lines. In this case, the area of the molten resin 241 against which the reinforcing fibers 450 can collide (contact) increases, and the uniformity of distribution (attaching) of the reinforcing fibers 450 to the molten resin 241 is further improved.

The outlet port (opening) 402 of these nozzles 400 may open at the side face of the nozzle 400, but is preferably formed at the bottom face of the nozzle 400. Especially, when molten resin 241 is allowed to flow down in the tubular form or in the form of many rods or lines from the outlet port 402 formed at the bottom of nozzle 400, since there is no possibility of the molten resin 241 which flows down contacting with each other, the chance of contacting between reinforcing fibers 450 and molten resin 241 further increases, and distribution (attaching) of reinforcing fibers 450 to molten resin 241 readily becomes uniform.

(Screw Unit 1)

As shown in FIG. 1, the screw unit 1 is provided with cylinder 100, screw 110 inserted in chamber 101 formed in the cylinder 100 in the longitudinal direction thereof, driving unit 120 connected to the screw 110, and cylinder heater 130 positioned on the outer peripheral surface of the cylinder 100. The cylinder 100 has feed opening (inlet) 102 provided at a first end portion 100a side and outlet 103 provided at a second end portion 100b side (the second end portion 100b is opposite to the first end portion 100a), and the feed opening 102 and the outlet 103 communicate with each other through chamber 101. The feed opening 102 opens upwardly and is positioned below the mixer 4, and protective pipe 106 is connected to the feed opening 102.

The screw unit 1 shown in FIG. 1 is a single screw injection machine provided with a single screw 110, and driving unit 120 has motor 121 to rotate the screw 110 and pressing unit 122 (e.g., hydraulic cyliner) to push the screw 110 in the longitudinal direction thereof towards the second end portion 100b. Accordingly, the screw 110 is a reciprocating-screw which is rotatively driven by the motor 121 through gear 123 provided at the base end portion 110a and reciprocated in the direction of double end arrow 111 by pressing unit 122 at a given timing. As the screw 110, a single-flighted and full-flighted screw is employed, and mixing head 140 having a check ring mechanism is provided at the tip portion 110b of the screw 110.

Furthermore, the cylinder heater 130 keeps the temperature of cylinder 100 at a given temperature (which is optionally selected depending on the desired resin viscosity, etc. and not so as to cause deterioration of the resin with oxidation in a temperature range of the melting or higher of the resin used).

In the screw unit 1, the compression ratio is set at 4 or less, preferably 3 or less, especially preferably 2 or less, and the apparent shear rate is set at 100 sec$^{-1}$ or less, preferably 50 sec$^{-1}$ or less. The inventors found that if the compression ratio is more than 4 and the apparent shear rate is more than 100 sec$^{-1}$, the reinforcing fibers tend to form coils at the kneading, increasing the possibility of breakage of the fibers, and there is a limit in decrease of breakage of the reinforcing fibers.

Furthermore, since plasticization of the resin in screw unit 1 is unnecessary, shear rate and compression ratio for kneading in the screw unit 1 can be set at low levels independently and irrespective of those in melting extruder 2. Therefore, the apparent shear rate and compression ratio in the screw unit 1 are set smaller than those in melting extruder 2. As a result, the chance of breakage of the reinforcing fibers in screw unit 1 diminishes and, thus, the reinforcing fibers are kept long in their length.

The screw 110 is sectioned into the three zones of feed zone 113, compression zone 114 and metering zone 115 in succession from the base end portion 110a to the tip portion 110b. That is, the screw 110 has the feed zone 113 having a first screw channel depth, the compression zone 114 connecting to the feed zone 113 and having a screw channel depth which shifts from the first screw channel depth to a second channel depth which is smaller than the first channel depth, and the metering zone 115 connecting to the compression zone 114 and having the second screw channel depth.

The compression ratio of the screw 110 according to the present invention is defined by the following formula.

$$\text{(Compression ratio)} = \text{(channel depth of feed zone 113)/(channel depth of metering zone 115)}$$

The apparent shear rate is defined by the following formula.

Apparent shear rate=$\pi Dn/60$ H

| | |
|---|---|
| D: | Diameter of screw 110 (mm) |
| n: | Speed of rotation of screw 110 (r.p.m) |
| H: | The minimum channel depth of screw 110 (mm) |

The ratio of length of feed zone 113, that of compression zone 114 and that of metering zone 115 is set as follows: the length of feed zone 113 is 1.5–2.5 times, preferably 1.8–2.3 times that of metering zone 115 and the length of compression zone 114 is 0.8–1.5 times, preferably 0.9–1.3 times that of metering zone 115. When the ratio of the length is set as mentioned above, heat is sufficiently given to resin from cylinder heater 130 and pressure and shearing action applied to the zone where the resin are melted decrease to more effectively inhibit breakage of the reinforcing fibers. Moreover, the screw length (L) which is the total length of the respective zones is preferably set at 20 times or more the screw diameter (D), and the screw flight pitch is preferably set at 1–1.3 times the screw diameter (D). Thus, the period during which shearing force is applied to the resin and the reinforcing fibers is relatively short and breakage of the reinforcing fibers is further inhibited.

For example, the channel depth of feed zone 113 is 32.8 mm and the channel depth of metering zone 115 is 19.3 mm, and the compression zone 114 is formed in the form of taper so that the channel depth changes from the channel depth of feed zone 113 (32.8 mm) to the channel depth of metering zone 115 (19.3 mm). The screw diameter (D) is set at 140 mm and the screw flight pitch is set at 1.2 times the screw diameter (D) so that the ratio (L/D) of the screw length (L) and the diameter (D) is 25 and the ratio of the lengths of feed zone 113, compression zone 114 and metering zone 115 is 2:1:1. In this case, the compression ratio of the screw 110 in this case is set at 1.7 and the apparent shear rate is set at 50 $\sec^{-1}$.

Figure 11:
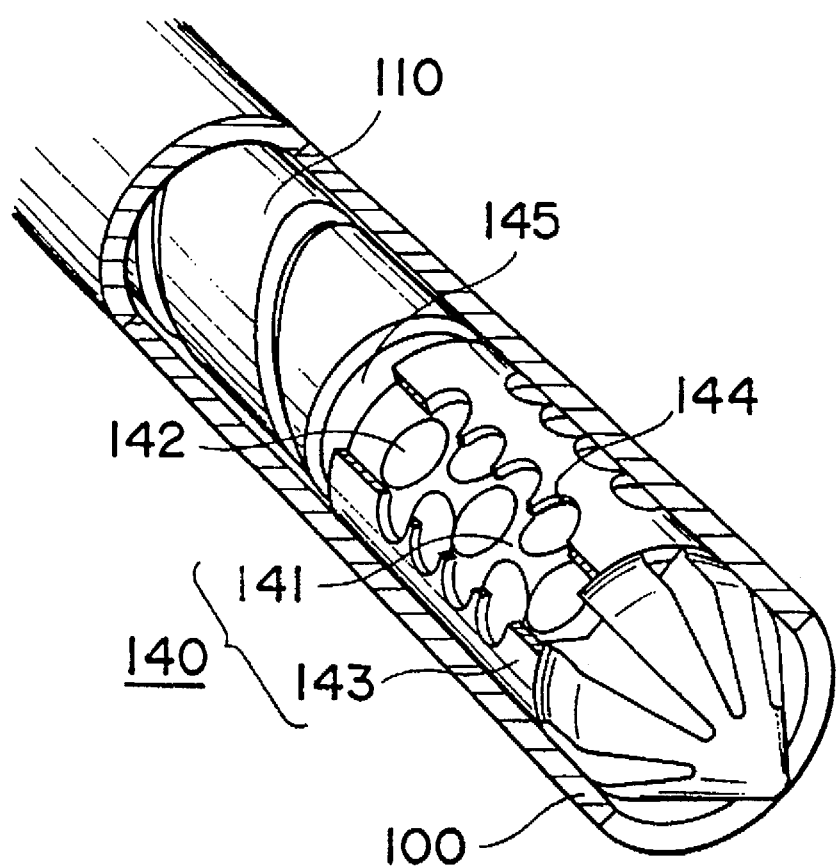
FIG. 11 is an oblique view of one example of the mixing head according to the present invention, shown partly cut away.

One example of mixing head 140 applicable to the present invention is shown in FIG. 11. The mixing head 140 shown in FIG. 11 has rotor 141 having a plurality of hemispherical cavities 142 on the surface thereof and free-moving mixing ring 143 having a plurality of columnar through-holes 144 and having a function of check ring. The mixing head is connected to the tip 110b of screw 110 inserted in the cylinder 100 through valve seat 145. The mixing head 140 has many passages where crossing and separating of resin are repeated. While the kneaded product comprising molten resin and reinforcing fibers which is to be stored in storage portion 105 between the tip of screw 110 (tip of mixing head 140) and the second end portion 100b of cylinder 100 passes the passages, dispersion of the reinforcing fibers in the molten resin is efficiently accelerated. Such mixing head is disclosed, for example, in U.S. Pat. No. 4,419,014 (1983) and EP A1 0340873 (1989), and U.S. Pat. No. 4,419,014 is incorporated herein by reference.

Figure 12:
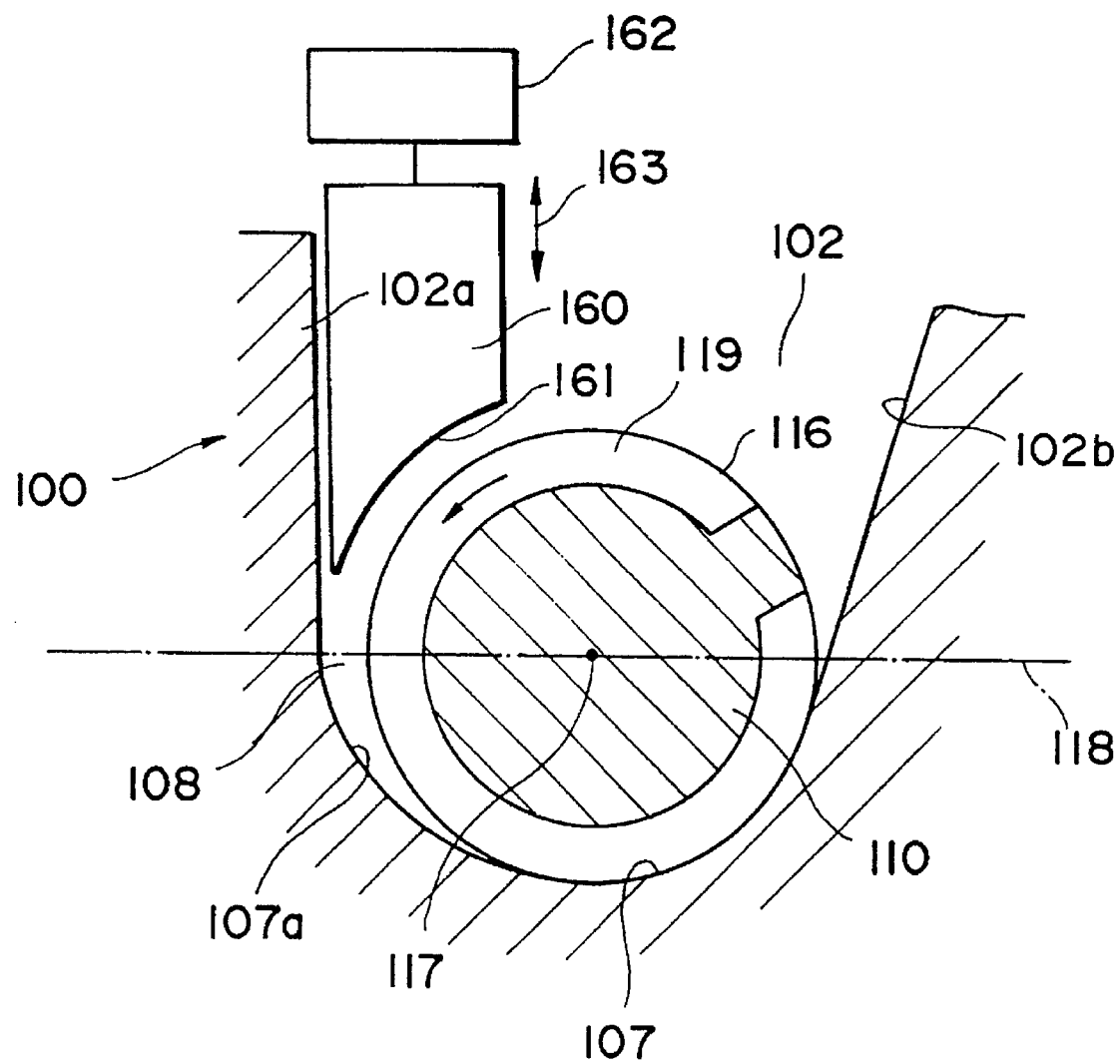
FIG. 12 is a sectional view of one example of the feed opening of the screw unit in the screw apparatus of the present invention.
Figure 13:
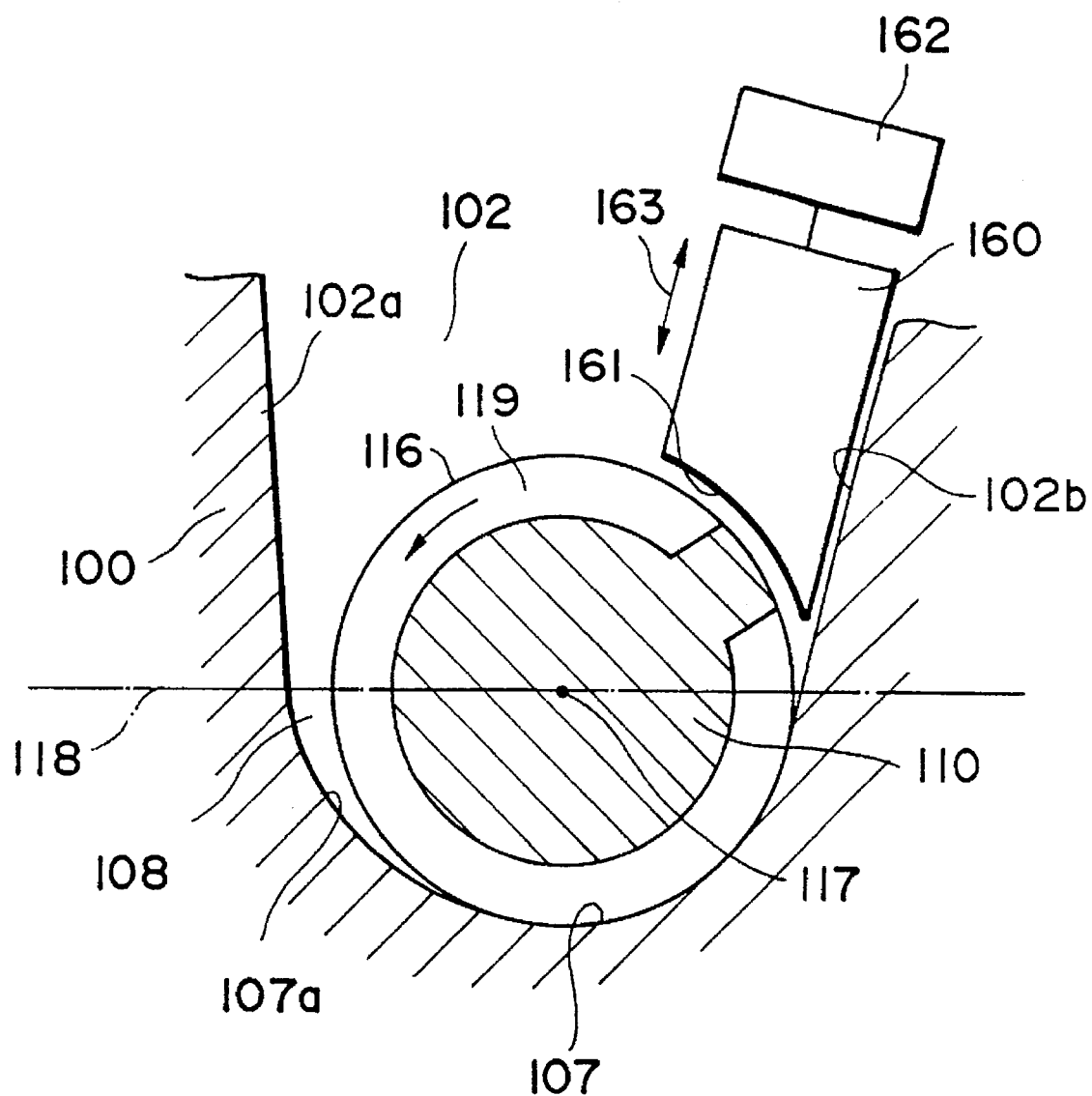
FIG. 13 is a sectional view of another example of the feed opening of the screw unit in the screw apparatus of the present invention.

Moreover, as shown in FIGS. 12 and 13, the screw unit 1 of this example further comprises a pushing rod 160 positioned along the cylinder side wall 102a or 102b (the side walls 102a and 102b are parallel to the longitudinal direction of the cylinder) defining the feed opening 102 and having a face 161 facing to the outer peripheral face 116 of the screw; and a rod driving mechanism 162 which reciprocates the pushing rod 160 up and down (shown by arrow 163).

Furthermore, as shown in FIGS. 12 and 13, in the screw unit 1 of this example, an introduction space 108 extending to below horizontal face 118 which passes the central axis 117 of the screw is formed between the outer peripheral face 116 of the screw and the cylinder inner face (inclined side wall) 107a continuing to the side wall 102a which defines the feed opening 102 provided at cylinder 100 {the side wall 102a is that being on the side (hereinafter referred to as "biting side") to which a portion of the outer peripheral face 116 which has temporarily left from cylinder inner face 107 at the feed opening 102 again approaches to the cylinder inner face 107 while the screw 110 is rotating}. This feed opening 102 has a rectangular horizontal section, and the size of the opening (which is a width in the direction perpendicular to the longitudinal direction of cylinder 100) is equal to or larger than the inner diameter of cylinder 100.

Specifically, as shown in FIGS. 12 and 13, the pushing rod 160 which is reciprocated (as shown in arrow 163) by reciprocation driving source 162 and has a tip 161 set at the shape (circular arc) corresponding to the outer peripheral face 116 of the screw is provided at feed opening 102 provided in cylinder 100 of screw unit 1. The pushing rod 160 is positioned along the periphery 102a (FIG. 12) on the biting side of feed opening 102 or periphery 102b (FIG. 13) opposite to the periphery 102a.

Accordingly, when molten resin 241 and reinforcing fibers 450 are introduced to the screw 110 under rotation from feed opening 102 and the pushing rod 160 is reciprocated by reciprocation driving source 162, molten resin 241 and reinforcing fibers 450 retained on the surface 116 of the screw are forcedly pushed in channel 119 of the screw by pushing rod 160.

Furthermore, in the hollow portion (cylinder inner face) 107 storing screw 110 in the vicinity of feed opening 102 is formed enlarged cavity portion (introduction space) 108, and this enlarged cavity portion 108 is formed in a certain range at the inner face 107a on the biting side of the hollow portion 107, preferably in the range up to below the central axis 117 of the screw. The cross-sectional shape of the enlarged hollow portion 108 is set at the shape of expanding outwardly from the section of cylinder inner face on which the enlarged hollow portion 108 is not formed. The sectional shape of the enlarged hollow portion 108 in the direction perpendicular to screw central axis 117 is set at the shade of circular arc and becomes gradually and downwardly smaller. When the molten resin 241 and reinforcing fibers 450 pushed into the channel 119 of the screw by pushing rod 160 are moved towards the inner face 107a on the biting side, they are smoothly pushed into the enlarged hollow portion 108, and, thereafter, transferred to the side of tip 110b of the screw by the rotation of screw 110. Furthermore, especially in the case shown in FIG. 12, the molten resin 241 and the reinforcing fibers 450 pushed in by the pushing rod 160 are more smoothly pushed into the enlarged hollow portion 108 on the biting side, and, thereafter, transferred toward the tip 110b of the screw by the rotation of screw 110.

The upper edge of the cylinder inner face 107a defining the enlarged hollow portion 108 is smoothly continued to the lower edge of the periphery 102a defining the feed opening 102. The reciprocation driving source 162 may be that which reciprocates the pushing rod 160 vibrationally.

By employing the above screw unit 1 provided with the pushing rod 160 and the introduction space 108, the molten resin 241 and the reinforcing fibers 450 introduced into feed opening 102 are surely, smoothly and stably introduced into the transferring space for kneading formed between the cylinder inner face and the screw outer face without causing separation by the guiding action of introduction space 108 and by pushing action of the pushing rod 106. Therefore, the dispersibility of the reinforcing fibers in the molded articles is further improved and, in addition, the filling rate of the fibers is further stabilized. Moreover, since the further longer reinforcing fibers can be used, the length of the reinforcing fibers in the molded articles can be maintained further longer and the dispersibility can also be maintained in the better state, and the filling rate of the fibers can also be stabilized.

Next, operation of the screw unit 1 will be explained.

When motor 121 and the rod driving mechanism 162 of the screw unit 1 is in the driving state, the molten resin 241 and the reinforcing fiber 450 introduced into feed opening 102 from the mixer 4 are transferred to the side of the tip 110b of the screw 110. In this example, since the screw 110 is a full-flighted screw, the molten resin 241 and the reinforcing fiber 450 move through feed zone 113, compression zone 114 and metering zone 115 of the screw 110 in succession. During this movement of the pellets, the molten resin 241 is maintained in the molten (plasticized) state owing to the heating by cylinder heater 130 and the heat generation (frictional heat) by shearing action and, furthermore, kneading of the reinforcing fibers 450 and the molten resin 241 by the screw 110 proceeds.

Since, in the screw unit 1, the compression ratio by the screw 110 is set at 4 or less and, furthermore, the apparent shear rate is set at 100 sec$^{-1}$, the chance of breakage of the reinforcing fibers during the kneading decreases and the degree of breakage of the reinforcing fibers in the kneaded product decreases. In addition, since the shear rate and the compression ratio for the kneading in the screw unit 1 are set at very low levels independently from those in the melting extruder 2, the chance of breakage of the reinforcing fibers in the screw unit 1 can be more reduced and the reinforcing fibers can be kept at the further longer length.

Furthermore, when screw 110 having the above-mentioned mixing head 140 fitted thereto is used, even when the dispersion state of the reinforcing fibers in the molten kneaded product which reaches the tip 110b of the screw 110 is insufficient, the dispersion state is improved during the molten kneaded product passing through the mixing head 140, but the reinforcing fibers are hardly broken during the period. Therefore, even if the compression ratio and the apparent shear rate in the screw unit 1 are set at a lower level, the dispersibility of the reinforcing fibers in the molten resin can be secured, and the reinforcing fibers in the molten resin can be maintained in the state of longer length.

When transfer of the molten resin by screw 110 proceeds, the molten resin containing the reinforcing fibers is stored in the storage portion 105 present on the side of the tip 110b of the screw 110, and the screw 110 (and mixing head 140) move back depending on the storage amount. When this storage amount reaches an amount determined in relation with the amount of the resin which is to constitute the fiber-reinforced resin article, the rotation of screw 110 by motor 121 is stopped. Thereafter, the screw 110 is pushed in the longitudinal direction by pressing unit 122 and the reinforcing fiber-containing molten resin stored in the storage portion 105 is injected from outlet 103 into mold cavity 150 of a pair of molds 151 connected to mold pressing unit 152.

When the injection operation by the screw unit 1 is completed and the screw 110 returns to the initial position, a series of the above operations is repeated again.

When using the screw apparatus (screw injection apparatus) of the present invention having the above construction, a molten reinforcing fiber-containing thermoplastic resin comprising, for example, a polypropylene resin and a glass fiber is compression molded by injecting it into mold cavity 150 of the injection molding machine under the above various conditions (feeding rate: 10 kg/min), average length of the reinforcing fibers in the resulting fiber-reinforced resin article is 3.5 mm or more and the dispersion state of the reinforcing fibers is good (highly uniform). The average length of the reinforcing fibers in this case is extremely longer than that obtained by conventional methods and the dispersion state is also markedly improved.

(Operation of Injection Molding)

Figure 14:
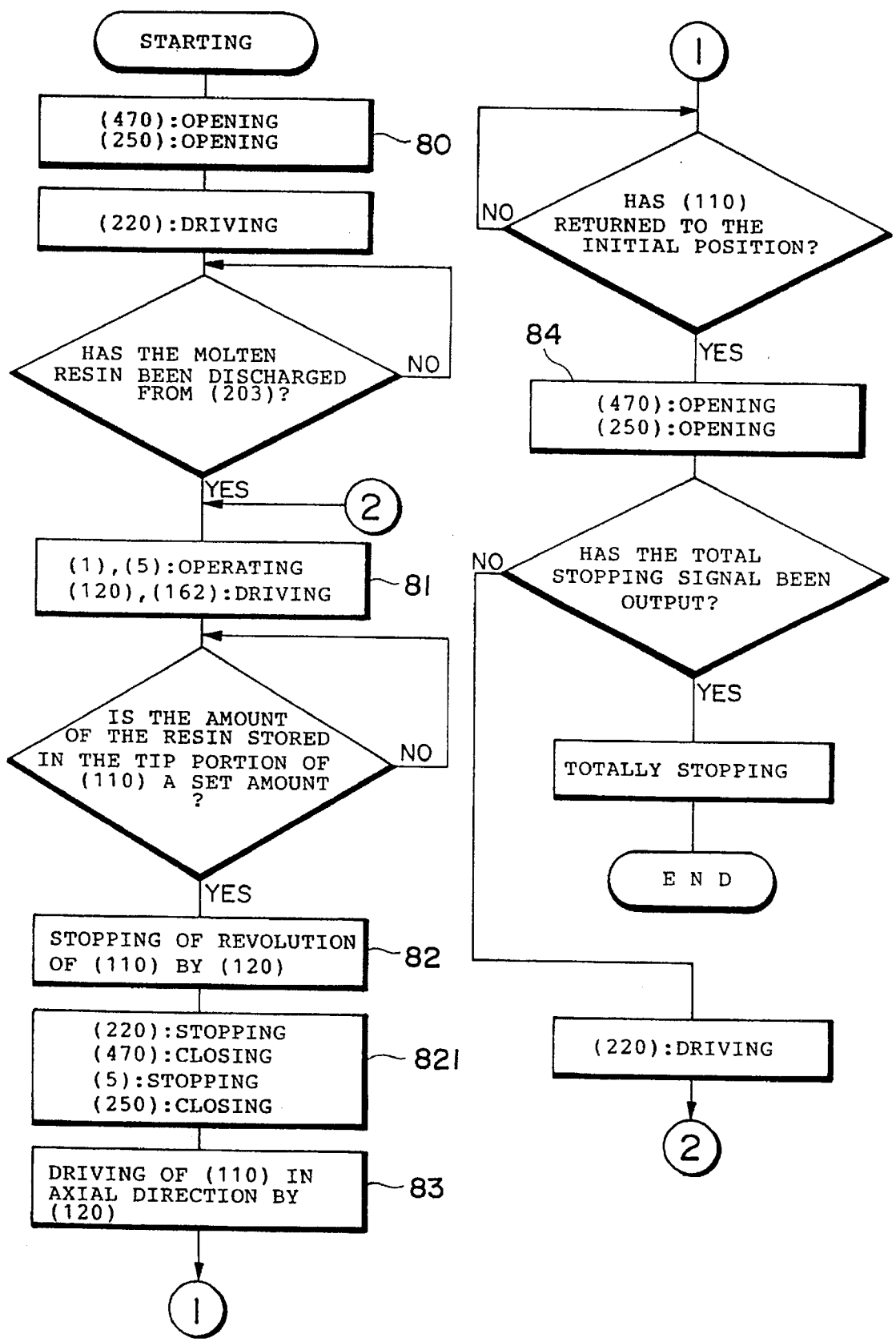
FIG. 14 is a flow chart which shows one example of operation of the screw apparatus of the present invention.

Next, operation (steps for molding fiber-reinforced resin articles) of the screw apparatus shown in FIG. 2 will be explained in detail in connection with the flow chart shown in FIG. 14. This operation is controlled by a computer controller.

When the above apparatus is started, a thermoplastic resin material (e.g., a polypropylene resin material) is introduced into melting extruder 2, and when the molten resin begins to be discharged from outlet 203, roving cutter 5 begins to work and reinforcing fibers 450 are distributed to the area of the molten resin flowing down from the outlet 203 and attached to molten resin 241 (step 81). When, for example, a polypropylene resin is used as the thermoplastic resin and glass fibers are used as the reinforcing fibers, feeding rate of the glass fibers is set at 10 kg/min and filling rate of the glass fibers in the molten resin is set at 30% by weight.

At the same time, operation of screw unit 1 is started, and screw driving unit 120 and reciprocation driving source 162 are in the driving state. Thus, the molten resin 241 and the reinforcing fibers 450 introduced into feed opening 102 are transferred to the side of tip 110b of screw 110. During the period of this transferring, kneading of the reinforcing fibers and the molten resin proceeds.

Since, in this case, the compression ratio of screw 110 is set at 4 or less and the apparent shear rate is set at 100 sec$^{-1}$ or less, the degree of breakage of the reinforcing fibers is lower than that in the conventional methods.

When transfer of the molten resin and the fibers by the screw 110 proceeds, they are stored on the side of tip 110b of screw 110 and the screw 110 moves back depending on the storing amount of them. When this storing amount reaches an amount determined in relation with the amount of the resin constituting the fiber-reinforced resin article, rotation by the screw driving unit 120 is stopped (step 82), and, thereafter, the screw 110 is pushed out in the longitudinal direction by the screw driving unit 120 to inject the stored reinforcing fiber-containing molten resin into a mold (not shown) (step 83).

Simultaneously with stopping of rotation of screw 110, rotation of rotation driving unit 220 is stopped and operation of roving cutter 5 is stopped. Accordingly, in the state of screw 110 being stopped, introduction of molten resin 241 and reinforcing fibers 450 into feed opening 102 is stopped.

Normally, even when rotation of screw 210 is stopped in the melting extruder 2, discharging of molten resin 241 from outlet 203 can be stopped in a moment with difficulty. Therefore, as shown in FIG. 2, shutter 470 to intercept the flowing down of molten resin 241 is provided in protective pipe 106 so that it is operated synchronously with shut-off valve 250 provided at outlet 203 of the melting extruder 2.

At the time of the introduction of molten resin 241, shut-off valve 250 and shutter 470 are opened (steps 80, 84), and when the screw 110 is stopped, shut-off valve 250 and shutter 470 are closed (step 821). According to such construction, it is possible to solve the problem that superfluous molten resin 24 and reinforcing fibers 450 are introduced from feed opening 102 while screw 110 is stopped.

When the injection operation by screw unit 1 is completed and screw 110 returns to the initial position, shut-off valve 250 and shutter 470 are opened and a series of the above-mentioned operations are repeated.

In the case where the outlet 203 of melting extruder 2 is set at a flat rectangular shape and the range of dropping of reinforcing fibers 450 nearly meets with the transverse width of molten resin 241 discharged from outlet 203, reinforcing fibers 450 are uniformed distributed (attached) to molten resin 241. Therefore, the reinforcing fibers are also uniformly dispersed in the fiber-reinforced resin article molded by a series of the above operations.

As shown in FIG. 1, when accumulator 3 is connected to melting extruder 2, the melting extruder 2 can continuously work irrespective of the operation of screw unit 1. When molten resin 241 begins to be discharged from outlet 303 of the accumulator 3, roving cutter 5 starts to work and reinforcing fibers 450 are distributed (attached) to the area of the flowing down of molten resin 241. The subsequent operations are the same as above.

Figure 15:
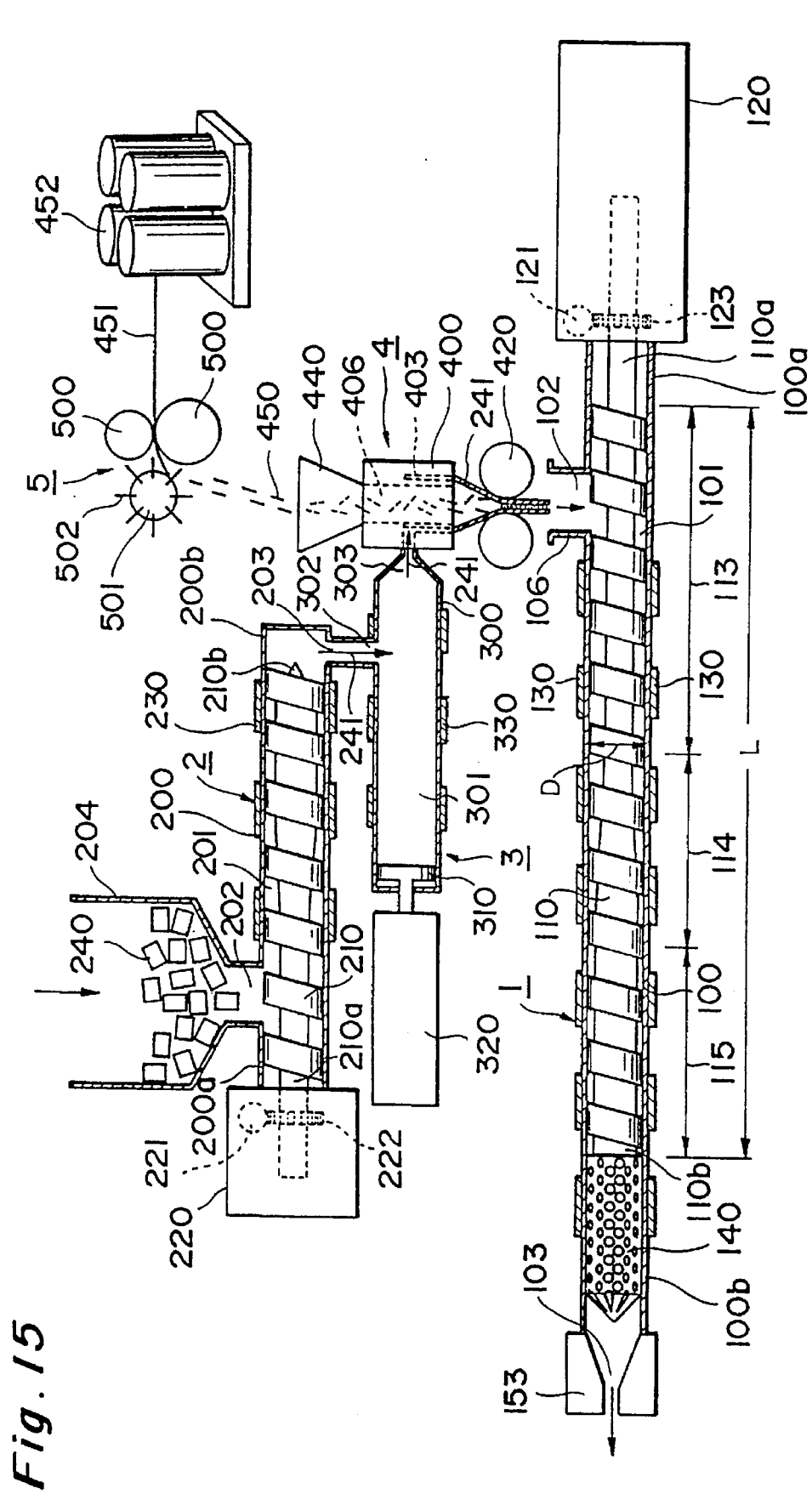
FIG. 15 is a schematic sectional view of still another example of the screw apparatus of the present invention.

In the above example, explanation is mainly given on the case where the screw apparatus of the present invention is a screw injection apparatus, but the screw apparatus of the present invention may be a screw extrusion apparatus as shown in FIG. 15. The screw extrusion apparatus shown in FIG. 15 is the same as the screw injection apparatus shown in FIG. 1, except that the former has a single screw extruder provided with a single screw 110, the driving unit 120 is not provided with pressing unit 122, the screw 110 is not a reciprocating-screw, and a die 153 is connected to the tip 100b of the cylinder 100. When a thermoplastic resin and reinforcing fibers are fed to the screw extrusion apparatus shown in FIG. 15, also kneading of the reinforcing fibers and the molten resin by screw 110 proceeds with maintaining the melted (plasticized) state of the thermoplastic resin during being transferred to the side of tip 110b of the screw 110. Since only the kneading of the reinforcing fibers and the molten resin by the screw 110 proceeds in the screw unit 1, it becomes possible to make the compression ratio and apparent shear rate in the screw unit 1 smaller than those in the melting extruder 2, and it becomes possible to obtain fiber-reinforced resin pellets, etc. having highly uniform dispersion state of the reinforcing fibers with keeping long fiber length. Furthermore, it becomes possible to use very long reinforcing fibers which have been difficult to use up to now and to obtain fiber-reinforced resin pellets, etc. having highly uniform dispersion state of the reinforcing fibers with keeping long fiber length which have not been able to be attained by the conventional methods.

The screw apparatus of the present invention is described above, but the melting extruder 2, the accumulator 3 and the mixer 4 in the screw apparatus mentioned above may be used as a mixing unit of the present invention. In other words, the melting extruder 2, the accumulator 3 and the mixer 4 in the screw apparatus shown in FIG. 1 and the like, are also one example of the mixing unit of the present invention.

According to the mixing unit of the present invention, at least a part of the reinforcing fibers 450 are efficiently attached to the molten resin 241 flowing down by the gravity in an open space, as mentioned above. Additionally, when the molten resin 241 and the reinforcing fibers 450 are introduced in this state into a screw unit 1 or the like, breakage (cutting) of the reinforcing fibers in the unit can be inhibited, and, in addition, very long reinforcing fibers can be used. Therefore, by using the mixing unit of the present invention, there can be obtained simply and efficiently fiber-reinforced resin articles and fiber-reinforced resin pellets containing long reinforcing fibers which have not hitherto been able to be attained.

Figure 16:
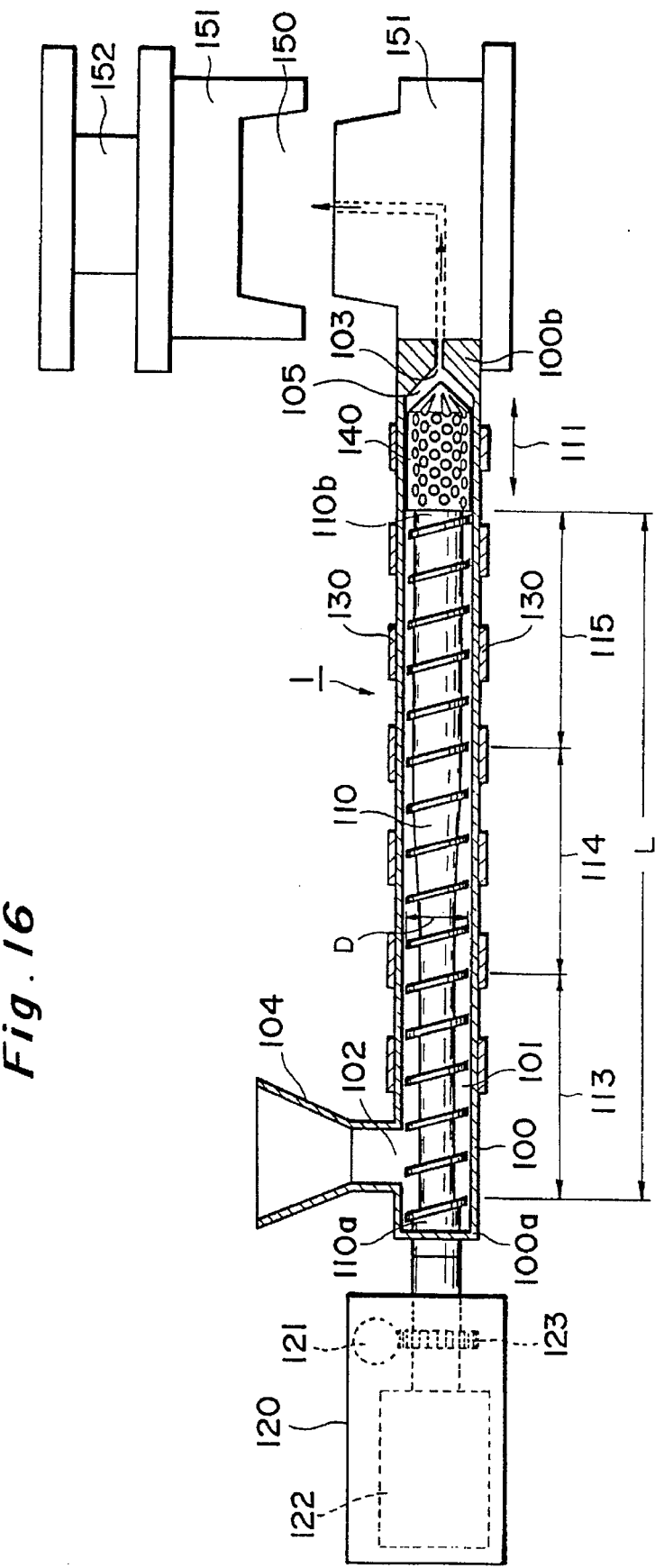
FIG. 16 is a schematic sectional view of one example of the screw unit of the present invention.

Further, the screw unit 1 in the screw apparatus mentioned above may be used as an independent screw unit as shown in FIG. 16. The screw unit 1 shown in FIG. 16 which is used as an independent screw unit will be explained hereunder.

The screw unit 1 shown in FIG. 16 is the same as that shown in FIG. 1 except that hopper 104 is substituted for the protective pipe 106 shown in FIG. 1. Operation of the screw unit 1 shown in FIG. 16 is as follows.

When motor 121 of the screw unit 1 is in the driving state, for example, a reinforcing fiber (glass fiber)-containing polypropylene resin pellets (not shown) introduced into feed opening 102 is transferred to the side of the tip 110b of the screw 110. In this example, since the screw 110 is a full-flighted screw, the resin pellets moves through feed zone 113, compression zone 114 and metering zone 115 of the screw 110 in succession. During this movement of the pellets, the resin pellets are melted (plasticized) owing to the heating by cylinder heater 130 and the heat generation (frictional heat) by shearing action and, furthermore, kneading of the reinforcing fibers and the molten resin by the screw 110 proceeds.

Since in the screw unit 1, the compression ratio by the screw 110 is set at 4 or less and, furthermore, the apparent shear rate is set at 100 sec$^{-1}$ the chance of breakage of the reinforcing fibers during the kneading decreases and the degree of breakage of the reinforcing fibers in the kneaded product decreases. The conditions of a compression ratio of 4 or less and an apparent shear rate of 100 sec$^{-1}$ or less are the ranges in which it has hitherto been considered to be difficult to efficiently melt the fiber-reinforced resin pellets or resin material and highly uniformly disperse the reinforcing fibers in the molten resin since conventionally it has been considered to be especially important to increase the kneading speed.

Further, as mentioned above, since the length of feed zone 113 in respect to the length of compression zone 114 and metering zone 115 is set longer than that in conventional units, heat is sufficiently given to the resin pellets or the like from the cylinder heater 130, and less pressure and shearing action are applied to the zone where the resin pellets or the like are melted. As a result, the chance of breakage of the reinforcing fibers in the molten resin further decreases and the reinforcing fibers can be maintained in the state of longer length. Since the compression ratio and the apparent shear rate in the screw unit of the present invention are smaller than in the conventional techniques, heat generation owing to the shearing action is relatively small. Therefore, it is important that application of heat to the resin pellets or the like from the cylinder heater 130 is sufficiently performed in the feed zone 113.

Furthermore, as mentioned above, since the screw flight pitch is set wider than in conventional units, the period during which shearing force is applied to the resin and the reinforcing fibers is relatively short, whereby the reinforcing fibers in the molten resin can be maintained in the further longer state.

Furthermore, when screw 110 having the above-mentioned mixing head 140 fitted thereto is used, even when the dispersion state of the reinforcing fibers in the molten kneaded product which reaches the tip 110b of the screw 110 is insufficient, the dispersion state is improved during the molten kneaded product passing through the mixing head 140, but the reinforcing fibers are hardly broken during the period. Therefore, even if the compression ratio and the apparent shear rate in the screw unit 1 are set at a lower level, the dispersibility of the reinforcing fibers in the molten resin can be secured, and the reinforcing fibers in the molten resin can be maintained in the state of longer length.

When transfer of the molten resin by screw 110 proceeds, the molten resin containing the reinforcing fibers is stored in the storage portion 105 present on the side of the tip 110b of the screw 110, and the screw 110 (and mixing head 140) move back depending on the storage amount. When this storage amount reaches an amount determined in relation with the amount of the resin which is to constitute the fiber-reinforced resin article, the rotation of screw 110 by motor 121 is stopped. Thereafter, the screw 110 is pushed in the longitudinal direction by pressing unit 122 and the reinforcing fiber-containing molten resin stored in the storage portion 105 is injected from outlet 103 into mold cavity 150 of a pair of molds 151 connected to mold pressing unit 152.

When the injection operation by the screw unit 1 is completed and the screw 110 returns to the initial position, a series of the above operations is repeated again.

When using the screw unit 1 having the above construction (screw injection machine), a molten reinforcing fiber-containing thermoplastic resin is compression molded by injecting, for example, reinforcing fiber (glass fiber)-containing polypropylene resin pellets (trademark: SEL-STRAN manufactured by Poly Plastic Co., Ltd.) into mold cavity 150 of an injection molding machine, the average length of the reinforcing fibers in the resulting article is about 1.5–2 times as long as the average length of the reinforcing fibers in the article obtained by similarly carrying out molding using a conventional screw injection machine in which a conventional usual full-flighted screw is used. Thus, according to the present invention, the fibers can be maintained in the greatly longer state. The various conditions in the above conventional screw injection machine are as follows:

| (Compression ratio) | 4.3 |
|---|---|
| (Apparent shear rate) | 2.60 sec$^{-1}$ |
| (Presence of mixing head) | none |

In the screw unit 1 of this example, a full-flighted screw of 4 or less in compression ratio and 100 sec$^{-1}$ or less in shear rate is used as the screw 110. By using such screw, breakage of the reinforcing fibers in the screw part can be inhibited as compared with the case where conventional screw injection machines having other full-flighted screws or double-flighted screws. In the recent screw injection machines, increase of kneading speed is considered important and double-flighted screws or sub-flighted screws are generally employed as the screw, and full-flighted screws are used occasionally. In a case where fiber-reinforced resin articles are molded using conventional screw injection machines having such a full-flighted screw and having a compression ratio of more than 4 and an apparent shear rate of more than 100 sec$^{-1}$, the reinforcing fibers are apt to be broken at the time of kneading of the molten resin and the fibers, and the reinforcing fibers contained in the resulting fiber-reinforced resin articles are short and strength of the articles is insufficient.

An embodiment of using fiber-reinforced resin pellets are used in the screw unit 1 shown in FIG. 16 is mainly explained hereabove, but the reinforcing fibers are not needed to be included in the thermoplastic resin pellets and the thermoplastic resin material and the reinforcing fibers may be separately introduced from the feed opening 102. In the case of separately introducing the thermoplastic resin material and the reinforcing fibers, also the thermoplastic resin material is melted (plasticized) during being transferred to the tip 110b side of the screw 110, and, simultaneously, kneading of the reinforcing fibers and the molten resin by the screw 110 proceeds. Thus, as in the above example, it becomes possible to obtain fiber-reinforced resin articles highly uniformed in the dispersion state of the reinforcing fibers with maintaining the long fiber length.

Moreover, in the screw unit 1 shown in FIG. 16, the reinforcing fibers and the previously molten thermoplastic resin may be separately or simultaneously introduced from feed opening 102. In this case, only the kneading of the reinforcing fibers and the molten resin by screw 110 proceeds in the screw unit 1, and, therefore, the compression ratio and the apparent shear rate can be further reduced than in the above example, and it becomes possible to obtain fiber-reinforced resin articles highly uniformed in the dispersion state of the reinforcing fibers with maintaining the further longer fiber length than in the above example.

Furthermore, as in the case of the screw apparatus of the present invention mentioned above, when the mixer, etc. according to the present invention are used, it becomes possible to use very long reinforcing fibers which have heretofore been difficult to use and thus, it becomes possible to obtain fiber-reinforced resin articles highly uniformed in the dispersion state of the reinforcing fibers with containing longer fibers which have not been able to be attained up to now.

Figure 17:
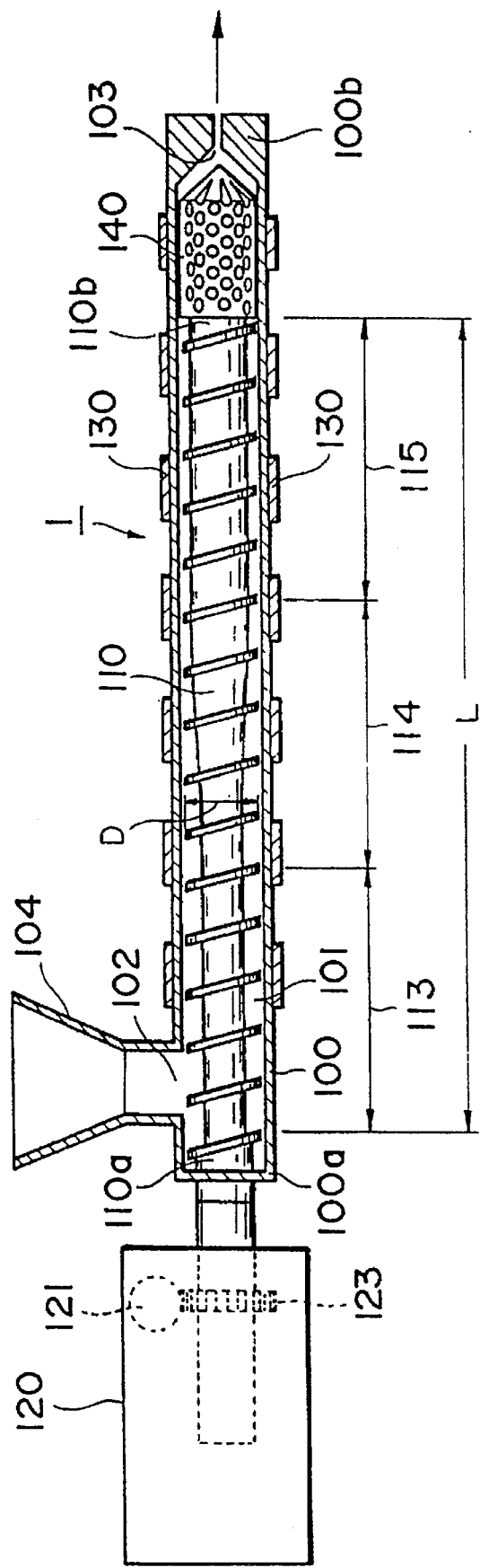
FIG. 17 is a schematic sectional view of another example of the screw unit of the present invention.

In the above example, explanation has been made of the case where the screw unit 1 is a screw injection machine, but the screw unit 1 of the present invention may be a screw extruder as shown in FIG. 17. The screw extruder shown in FIG. 17 is a single screw extruder provided with a single screw 110, and is the same as the screw injection machine shown in FIG. 16 except that the driving unit 120 does not have the pressing unit 122 and the screw 11 is not a reciprocating-screw. When the thermoplastic resin material and the reinforcing fibers are separately fed to the screw extruder 1 shown in FIG. 17, also the thermoplastic resin material is melted (plasticized) during being transferred to the tip 110b side of the screw 110, and, simultaneously, kneading of the reinforcing fibers and the molten resin by the screw 110 proceeds. Thus, it becomes possible to obtain fiber-reinforced resin pellets, etc. having highly uniform dispersion state of the reinforcing fibers with maintaining the longer fiber length than in the conventional techniques. Further, when the reinforcing fibers and the previously melted thermoplastic resin are introduced into the screw extruder shown in FIG. 17, only the kneading of the reinforcing fibers and the molten resin by the screw 110 proceeds in the screw unit 1, and, therefore, the compression ratio and the apparent shear rate can be further reduced than in the above example, and it becomes possible to obtain fiber-reinforced resin pellets, etc. highly uniformed in the dispersion state of the reinforcing fibers with maintaining the further longer fiber length than in the above example. Furthermore, as in the case of the screw apparatus of the present invention explained above, when the mixer, etc. according to the present invention are used, it becomes possible to use very long reinforcing fibers which have heretofore been difficult to use and, thus, it becomes possible to obtain fiber-reinforced resin pellets, etc. highly uniformed in the dispersion state of the reinforcing fibers with containing longer fibers which have not been able to be attained up to now.

According to the screw unit (screw injection machine, screw extruder) of the present invention, it becomes possible to obtain fiber-reinforced resin articles having highly uniform dispersion state of the reinforcing fibers with keeping the fiber length longer than that in the conventional methods even when fiber-reinforced resin pellets are used, and, furthermore, it becomes possible to obtain fiber-reinforced resin articles and fiber-reinforced resin pellets having highly uniform dispersion state of the reinforcing fibers with containing long reinforcing fibers which have not been able to be attained by the conventional methods.

Moreover, according to the screw apparatus (screw injection apparatus, screw extrusion apparatus) and the mixing unit of the present invention as well as the method (injection method, extrusion method) of the present invention for supplying a reinforcing fiber-containing molten thermoplastic resin using the apparatus, it becomes possible to obtain fiber-reinforced resin articles and fiber-reinforced resin pellets containing long reinforcing fibers which have not been able to be attained by the conventional methods, and, furthermore, it becomes possible to make highly uniform the dispersion state of the reinforcing fibers in these articles and pellets.

Therefore, according to the present invention, it becomes possible to obtain fiber-reinforced resin articles which are especially useful for those which require a high impact strength, such as panels for concrete forming, since the length of the reinforcing fibers contained in the fiber-reinforced resin articles is long enough to achieve sufficient strength, especially impact strength.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Applications No. 246590/1994 filed on Oct. 12, 1994, No. 295249/1994 and No. 295250/1994 both filed on Nov. 29, 1994 and No. 8270/1995 filed on Jan. 23, 1995 are hereby incorporated by reference.

What is claimed is:

1. A screw apparatus comprising:
   a melting extruder comprising a barrel which has a resin material inlet provided on a first end portion side thereof and a molten resin outlet provided on a second end portion side thereof, said second end portion being opposite to the first end portion, an extruding means positioned in the barrel, a driving means connected to the extruding means and a barrel heater for heating the barrel;
   a screw unit comprising a cylinder having a feed opening provided on a first end portion side thereof and positioned under the molten resin outlet and an outlet provided on a second end portion side thereof, said second end portion being opposite to the first end portion, a screw inserted in the cylinder, a driving unit connected to the screw, and a cylinder heater for keeping the cylinder at a given temperature; and
   a mixer which is positioned between the molten resin outlet and the feed opening, which has a reinforcing fiber inlet, which defines a space through which reinforcing fibers fed from the reinforcing fiber inlet flow down owing to gravity together with molten resin extruded from the molten resin outlet and then the reinforcing fibers and the molten resin are fed to the feed opening, and in which at least a part of the reinforcing fibers attach to the molten resin flowing down owing to gravity in an open space.

2. A screw apparatus according to claim 1, wherein a compression ratio in the screw unit is 4 or less and an apparent shear rate in the screw unit is 100 sec$^{-1}$ or less.

3. A screw apparatus according to claim 1, wherein an apparent shear rate and a compression ratio in the screw unit are smaller than an apparent shear rate and a compression ratio in the melting extruder, respectively.

4. A screw apparatus according to claim 1, wherein the screw has a feed zone having a first screw channel depth, a compression zone connecting to the feed zone and having a screw channel depth which changes from the first screw channel depth to a second screw channel depth smaller than the first screw channel depth and a metering zone connecting to the compression zone and having the second screw channel depth, ratio of length of the feed zone, that of the compression zone and that of the metering zone being in a range of 1.5–2.5:0.8–1.5:1, and ratio (L/D) of length (L) of the screw and diameter (D) of the screw being 20 or more.

5. A screw apparatus according to claim 1, wherein the screw has a flight having a flight pitch of 1 to 1.3 times as large as diameter (D) of the screw.

6. A screw apparatus according to claim 1, wherein the screw has a mixing head at a tip thereof.

7. A screw apparatus according to claim 1, wherein the screw unit is a single screw injection machine having a single reciprocating-screw and the driving unit has a motor for rotating the screw and a pressing unit for pushing the screw in longitudinal direction thereof toward the second end portion.

8. A screw apparatus according to claim 1, wherein the screw unit is a single screw extruder having a single screw and the driving unit has a motor for rotating the screw.

9. A screw apparatus according to claim 1, wherein the mixer further comprises:
   a nozzle provided with a first opening connected to the molten resin outlet, and a second opening provided at a bottom or side face thereof and communicating with the first opening through a resin passage, said second opening being at least one opening selected from a rectangular hole, a ring-shaped hole and a group of small holes; and
   a chute for guiding the reinforcing fibers fed from the reinforcing fiber inlet to around the molten resin extruded from the nozzle and flowing down.

10. A screw apparatus according to claim 1, wherein the mixer further comprises a nozzle provided with a first opening connected to the molten resin outlet, a second opening provided at a bottom thereof and communicating with the first opening through a resin passage, said second opening being a ring-shaped hole, a third opening functioning as the reinforcing fiber inlet, and a fourth opening provided inside the second opening and communicating with the reinforcing fiber inlet through a fiber passage.

11. A screw apparatus according to claim 1, wherein the mixer further comprises:
   a nozzle provided with a first opening connected to the molten resin outlet, a second opening provided at a bottom thereof and communicating with the first opening through a resin passage, said second opening being a ring-shaped hole, a third opening functioning as the reinforcing fiber inlet, and a fourth opening provided inside the second opening and communicating with the reinforcing fiber inlet through a fiber passage;

a nozzle heater for keeping the nozzle at a given temperature; and a pair of rollers which is positioned under the second and fourth openings and presses a ring-shaped molten resin extruded and flowing down from the nozzle together with reinforcing fibers being inside the ring-shaped molten resin to obtain a sheet-like molten resin having the reinforcing fibers sandwiched therebetween.

12. A screw apparatus according to claim 11, wherein the mixer further comprises:

a resin cutter positioned between the nozzle and the rollers for cutting the ring-shaped molten resin extruded and flowing down from the nozzle;

a hopper for guiding the reinforcing fibers to the reinforcing fiber inlet; and a valve for adjusting a pressure of molten resin passing through the resin passage in the nozzle.

13. A screw apparatus according to claim 1, wherein the mixer further comprises a fiber cutter for cutting reinforcing long fibers to obtain reinforcing fibers having a given length and then introducing the reinforcing fibers in scattered state into the reinforcing fiber inlet, said fiber cutter being positioned above the reinforcing fiber inlet.

14. A screw apparatus according to claim 1, wherein the melting extruder is a single screw extruder having a single extrusion screw, and the driving means has a motor for rotating the extrusion screw.

15. A screw apparatus according to claim 1, which further comprises an accumulator provided between the melting extruder and the mixer and having an accumulator inlet connected to the molten resin outlet and an accumulator outlet connected to the mixer.

16. A screw apparatus according to claim 1, wherein the feed opening has an opening width being equal to or more than an inner diameter of the cylinder, said opening width being a length of the feed opening in a direction perpendicular to longitudinal direction of the cylinder; and an introduction space which extends to below a horizontal plane passing a central axis of the screw is formed between an outer peripheral face of the screw and a cylinder internal face continuing to a cylinder side wall which defines the feed opening, said side wall being on a side where an outer peripheral part of the screw which has temporarily left from a cylinder internal face at the feed opening again approaches to the cylinder internal face while the screw is rotating.

17. A screw apparatus according to claim 1, which further comprises:

a pushing rod positioned along a cylinder side wall which defines the feed opening, said side wall being parallel to longitudinal direction of the cylinder, and having a face facing to an outer peripheral face of the screw; and a rod driving mechanism which reciprocates the pushing rod up and down.

18. A mixing unit comprising: a melting extruder comprising a barrel which has a resin material inlet provided on a first end portion side thereof and a molten resin outlet provided on a second end portion side thereof, said second end portion being opposite to the first end portion, an extruding means positioned in the barrel, a driving means connected to the extruding means and a barrel heater for heating the barrel; and a mixer which is connected to the molten resin outlet, which has a reinforcing fiber inlet, which defines a space through which reinforcing fibers fed from the reinforcing fiber inlet flow down owing to gravity together with molten resin extruded from the molten resin outlet, and in which at least a part of the reinforcing fibers attach to the molten resin flowing down owing to gravity in an open space.

19. A mixing unit according to claim 18, wherein the mixer further comprises:

a nozzle provided with a first opening connected to the molten resin outlet, and a second opening provided at a bottom or side face thereof and communicating with the first opening through a resin passage, said second opening being at least one opening selected from a rectangular hole, a ring-shaped hole and a group of small holes; and a chute for guiding the reinforcing fibers fed from the reinforcing fiber inlet to around the molten resin extruded from the nozzle and flowing down.

20. A mixing unit according to claim 18, wherein the mixer further comprises a nozzle provided with a first opening connected to the molten resin outlet, a second opening provided at a bottom thereof and communicating with the first opening through a resin passage, said second opening being a ring-shaped hole, a third opening functioning as the reinforcing fiber inlet, and a fourth opening provided inside the second opening and communicating with the reinforcing fiber inlet through a fiber passage.

21. A mixing unit according to claim 18, wherein the mixer further comprises:

a nozzle provided with a first opening connected to the molten resin outlet, a second opening provided at a bottom thereof and communicating with the first opening through a resin passage, said second opening being a ring-shaped hole, a third opening functioning as the reinforcing fiber inlet, and a fourth opening provided inside the second opening and communicating with the reinforcing fiber inlet through a fiber passage;

a nozzle heater for keeping the nozzle at a given temperature; and a pair of rollers which is positioned under the second and fourth openings and presses a ring-shaped molten resin extruded and flowing down from the nozzle together with reinforcing fibers being inside the ring-shaped molten resin to obtain a sheet-like molten resin having the reinforcing fibers sandwiched therebetween.

22. A mixing unit according to claim 21, wherein the mixer further comprises:

a resin cutter positioned between the nozzle and the rollers for cutting the ring-shaped molten resin extruded and flowing down from the nozzle;

a hopper for guiding the reinforcing fibers to the reinforcing fiber inlet; and a valve for adjusting a pressure of molten resin passing through the resin passage in the nozzle.

23. A mixing unit according to claim 18, wherein the mixer further comprises a fiber cutter for cutting reinforcing long fibers to obtain reinforcing fibers having a given length and then introducing the reinforcing fibers in scattered state into the reinforcing fiber inlet, said fiber cutter being positioned above the reinforcing fiber inlet.

24. A mixing unit according to claim 18, wherein the melting extruder is a single screw extruder having a single extrusion screw, and the driving means has a motor for rotating the extrusion screw.

25. A mixing unit according to claim 18, which further comprises an accumulator provided between the melting extruder and the mixer and having an accumulator inlet connected to the molten resin outlet and an accumulator outlet connected to the mixer.

26. A screw unit comprising a cylinder having a feed opening provided on a first end portion side thereof and an outlet provided on a second end portion side thereof, said second end portion being opposite to the first end portion, a screw inserted in the cylinder, a driving unit connected to the screw, and a cylinder heater for keeping the cylinder at a given temperature, in which a compression ratio is 4 or less, and an apparent shear rate is 100 sec$^{-1}$ or less.

27. A screw unit according to claim 26, wherein the screw has a feed zone having a first screw channel depth, a compression zone connecting to the feed zone and having a screw channel depth which changes from the first screw channel depth to a second screw channel depth smaller than the first screw channel depth and a metering zone connecting to the compression zone and having the second screw channel depth, ratio of length of the feed zone, that of the compression zone and that of the metering zone being in a range of 1.5–2.5:0.8–1.5:1, and ratio (L/D) of length (L) of the screw and diameter (D) of the screw being 20 or more.

28. A screw unit according to claim 26, wherein the screw has a flight having a flight pitch of 1 to 1.3 times as large as diameter (D) of the screw.

29. A screw unit according to claim 26, wherein the screw has a mixing head at a tip thereof.

30. A screw unit according to claim 26, wherein the screw unit is a single screw injection machine having a single reciprocating-screw and the driving unit has a motor for rotating the screw and a pressing unit for pushing the screw in longitudinal direction thereof toward the second end portion.

31. A screw unit according to claim 26, wherein the screw unit is a single screw extruder having a single screw and the driving unit has a motor for rotating the screw.

32. A screw unit according to claim 26, wherein the screw unit further comprises a mixer which is positioned above the feed opening, which has a molten resin inlet and a reinforcing fiber inlet, which defines a space through which reinforcing fibers fed from the reinforcing fiber inlet flow down owing to gravity together with molten resin fed from the molten resin inlet and then the reinforcing fibers and the molten resin are fed to the feed opening, and in which at least a part of the reinforcing fibers attach to the molten resin flowing down owing to gravity in an open space.

33. A screw unit according to claim 32, wherein the mixer further comprises:

a nozzle provided with a first opening functioning as the molten resin inlet, and a second opening provided at a bottom or side face thereof and communicating with the first opening through a resin passage, said second opening being at least one opening selected from a rectangular hole, a ring-shaped hole and a group of small holes; and a chute for guiding the reinforcing fibers fed from the reinforcing fiber inlet to around the molten resin extruded from the nozzle and flowing down.

34. A screw unit according to claim 32, wherein the mixer further comprises a nozzle provided with a first opening functioning as the molten resin inlet, a second opening provided at a bottom thereof and communicating with the first opening through a resin passage, said second opening being a ring-shaped hole, a third opening functioning as the reinforcing fiber inlet, and a fourth opening provided inside the second opening and communicating with the reinforcing fiber inlet through a fiber passage.

35. A screw unit according to claim 32, wherein the mixer further comprises:

a nozzle provided with a first opening functioning as the molten resin inlet, a second opening provided at a bottom thereof and communicating with the first opening through a resin passage, said second opening being a ring-shaped hole, a third opening functioning as the reinforcing fiber inlet, and a fourth opening provided inside the second opening and communicating with the reinforcing fiber inlet through a fiber passage;

a nozzle heater for keeping the nozzle at a given temperature; and a pair of rollers which is positioned under the second and fourth openings and presses a ring-shaped molten resin extruded and flowing down from the nozzle together with reinforcing fibers being inside the ring-shaped molten resin to obtain a sheet-like molten resin having the reinforcing fibers sandwiched therebetween.

36. A screw unit according to claim 35, wherein the mixer further comprises:

a resin cutter positioned between the nozzle and the rollers for cutting the ring-shaped molten resin extruded and flowing down from the nozzle;

a hopper for guiding the reinforcing fibers to the reinforcing fiber inlet; and a valve for adjusting a pressure of molten resin passing through the resin passage in the nozzle.

37. A screw unit according to claim 32, wherein the mixer further comprises a fiber cutter for cutting reinforcing long fibers to obtain reinforcing fibers having a given length and then introducing the reinforcing fibers in scattered state into the reinforcing fiber inlet, said fiber cutter being positioned above the reinforcing fiber inlet.

38. A screw unit according to claim 26, wherein the feed opening has an opening width being equal to or more than an inner diameter of the cylinder, said opening width being a length of the feed opening in a direction perpendicular to longitudinal direction of the cylinder; and an introduction space which extends to below a horizontal plane passing a central axis of the screw is formed between an outer peripheral face of the screw and a cylinder internal face continuing to a cylinder side wall which defines the feed opening, said side wall being on a side where an outer peripheral part of the screw which has temporarily left from a cylinder internal face at the feed opening again approaches to the cylinder internal face while the screw is rotating.

39. A screw unit according to claim 26, which further comprises:

a pushing rod positioned along a cylinder side wall which defines the feed opening, said side wall being parallel to longitudinal direction of the cylinder, and having a face facing to an outer peripheral face of the screw; and a rod driving mechanism which reciprocates the pushing rod up and down.

40. A method for supplying a reinforcing fiber-containing molten resin, which comprises:

a step of attaching at least a part of reinforcing fibers to molten resin flowing down owing to gravity in an open space outside a screw unit;

a step of feeding the reinforcing fibers and the molten resin to which at least a part of the reinforcing fibers attach to a feed opening of the screw unit; and a step of kneading the molten resin and the reinforcing fibers by a screw of the screw unit and supplying the resulting reinforcing fiber-containing molten resin from an outlet of the screw unit.

41. A method according to claim 40, wherein the screw unit is a screw injection machine and which further comprises a step of storing in around the outlet of the screw injection machine the reinforcing fiber-containing molten resin obtained by kneading with the screw of the screw injection machine and a step of injecting the reinforcing fiber-containing molten resin from the outlet into a molding cavity of a molding machine.

42. A method according to claim 40, wherein the screw unit is a screw extruder.

43. A method according to claim 40, wherein the molten resin and the reinforcing fibers are kneaded by the screw at a compression ratio of 4 or less and an apparent shear rate of 100 sec$^{-1}$ or less.

44. A method according to claim 40, which further comprises a step of extruding the molten resin from a molten resin outlet of a melting extruder and wherein the molten resin and the reinforcing fibers are kneaded by the screw at a compression ratio and an apparent shear rate which are smaller than those in the melting extruder, respectively.

45. A method according to claim 40, which further comprises a step of cutting reinforcing long fibers to obtain reinforcing fibers having a given length by means of a fiber cutter and directly feeding the reinforcing fibers in a scattered state from the fiber cutter.

46. A method according to claim 40, wherein the molten resin is allowed to flow down in a form of a strip and at least a part of the reinforcing fibers are attached to the molten resin in an area of its flowing down.

47. A method according to claim 40, wherein the molten resin is allowed to flow down in a form of a group of lines or rods having a space therebetween and at least a part of the reinforcing fibers are attached to the molten resin in an area of its flowing down.

48. A method according to claim 40, wherein the molten resin is allowed to flow down in a form of a tube and at least a part of the reinforcing fibers are attached to the molten resin while the reinforcing fibers are dropped owing to gravity inside the tubular molten resin.

49. A method according to claim 40, wherein the molten resin is allowed to flow down in a form of a tube, the reinforcing fibers are dropped owing to gravity inside the tubular molten resin, the tubular molten resin is pressed together with the reinforcing fibers being inside the tubular molten resin to obtain a sheet-like molten resin having the reinforcing fibers sandwiched between the molten resin sheets, and the resulting sheet-like molten resin is fed to the feed opening of the screw unit.

* * * * *